US012619829B2

(12) United States Patent
Boudreau et al.

(10) Patent No.: US 12,619,829 B2
(45) Date of Patent: May 5, 2026

(54) AUTOMATIC GENERATION OF SCIENTIFIC ARTICLE METADATA

(71) Applicant: Praedicat, Inc., Culver City, CA (US)

(72) Inventors: Andrea Melissa Boudreau, Los Angeles, CA (US); Lauren Caston, Los Angeles, CA (US); Naresh Chebolu, Reston, VA (US); Adam Grossman, Los Angeles, CA (US); Liyang Hao, Los Angeles, CA (US); David Loughran, Santa Monica, CA (US); Michael Ragland, Tustin, CA (US); Robert Reville, Los Angeles, CA (US); Chun-Yuen Teng, Los Angeles, CA (US)

(73) Assignee: Praedicat, Inc., Culver City, CA (US)

( * ) Notice: Subject to any disclaimer, the term of this patent is extended or adjusted under 35 U.S.C. 154(b) by 36 days.

(21) Appl. No.: 18/641,428

(22) Filed: Apr. 21, 2024

(65) Prior Publication Data

US 2025/0077779 A1    Mar. 6, 2025

(51) Int. Cl.
G06F 17/00 (2019.01)
G06F 16/23 (2019.01)
G06F 40/30 (2020.01)

(52) U.S. Cl.
CPC .......... G06F 40/30 (2020.01); G06F 16/2379 (2019.01)

(58) Field of Classification Search
None
See application file for complete search history.

(56) References Cited

U.S. PATENT DOCUMENTS

| | | | |
|---|---|---|---|
| 6,728,725 B2 | 4/2004 | Garfield | |
| 6,873,914 B2 | 3/2005 | Winfield | |
| 8,671,102 B2 | 3/2014 | Reville | |
| 9,430,739 B2 | 8/2016 | Grossman | |
| 10,579,930 B2 | 3/2020 | Grossman | |
| 10,585,990 B1 * | 3/2020 | Boudreau | G06F 16/2379 |
| 10,909,323 B2 * | 2/2021 | Boudreau | G06F 40/30 |
| 11,023,554 B1 * | 6/2021 | Miller | G06F 40/279 |
| 11,127,057 B2 * | 9/2021 | Swanson | G06N 3/006 |
| 12,086,549 B2 * | 9/2024 | Boudreau | G06F 16/316 |
| 2006/0106847 A1 | 5/2006 | Eckardt, III | |
| 2006/0122849 A1 | 6/2006 | Masuyama | |
| 2008/0228574 A1 * | 9/2008 | Stewart | G06Q 30/0273 |
| | | | 705/14.69 |
| 2010/0250547 A1 | 9/2010 | Grefenstette | |
| 2011/0264649 A1 | 10/2011 | Hsiao | |
| 2014/0006332 A1 | 1/2014 | Abercrombie | |
| 2014/0114987 A1 | 4/2014 | Hoeng | |
| 2014/0195539 A1 | 7/2014 | Chen | |
| 2014/0375667 A1 | 12/2014 | Reville | |
| 2015/0012452 A1 | 1/2015 | Damman | |

(Continued)

*Primary Examiner* — Satwant K Singh
(74) *Attorney, Agent, or Firm* — Polsinelli PC; Simon Booth

(57) ABSTRACT

Examples of the disclosure are directed to systems and methods of using natural language processing techniques to automatically assign metadata to articles as they are published. The automatically-assigned metadata can then feed into the algorithms that calculate updated causation scores for agent-outcome hypotheses, powering live visualizations of the data that update automatically as new scientific articles become available.

11 Claims, 25 Drawing Sheets

(56)            References Cited

U.S. PATENT DOCUMENTS

| | | | |
|---|---|---|---|
| 2015/0178628 A1* | 6/2015 | Grossman | ................ G06N 7/01 |
| | | | 706/46 |
| 2015/0193798 A1 | 7/2015 | Poreh | |
| 2015/0339605 A1 | 11/2015 | Reville | |
| 2017/0161837 A1 | 6/2017 | Loughran | |
| 2017/0161839 A1 | 6/2017 | Loughran | |
| 2019/0258560 A1 | 8/2019 | Weissinger | |

* cited by examiner

100

Dangerous Chemicals List — Updating Live

| Chemical | GC score |
|---|---|
| 1. bisphenol A | 0.90 |
| 2. DEHP | 0.88 |
| 3. lead | 0.82 |
| 4. salt | 0.65 |
| 5. aluminum | 0.50 |
| 6. benzene | 0.20 |

Dangerous Chemicals List — Updating Live

| Chemical | GC score |
|---|---|
| 1. bisphenol A | 0.95 |
| 2. lead | 0.90 |
| 3. DEHP | 0.88 |
| 4. salt | 0.75 |
| 5. aluminum | 0.49 |
| 6. benzene | 0.20 |

FIG. 1J

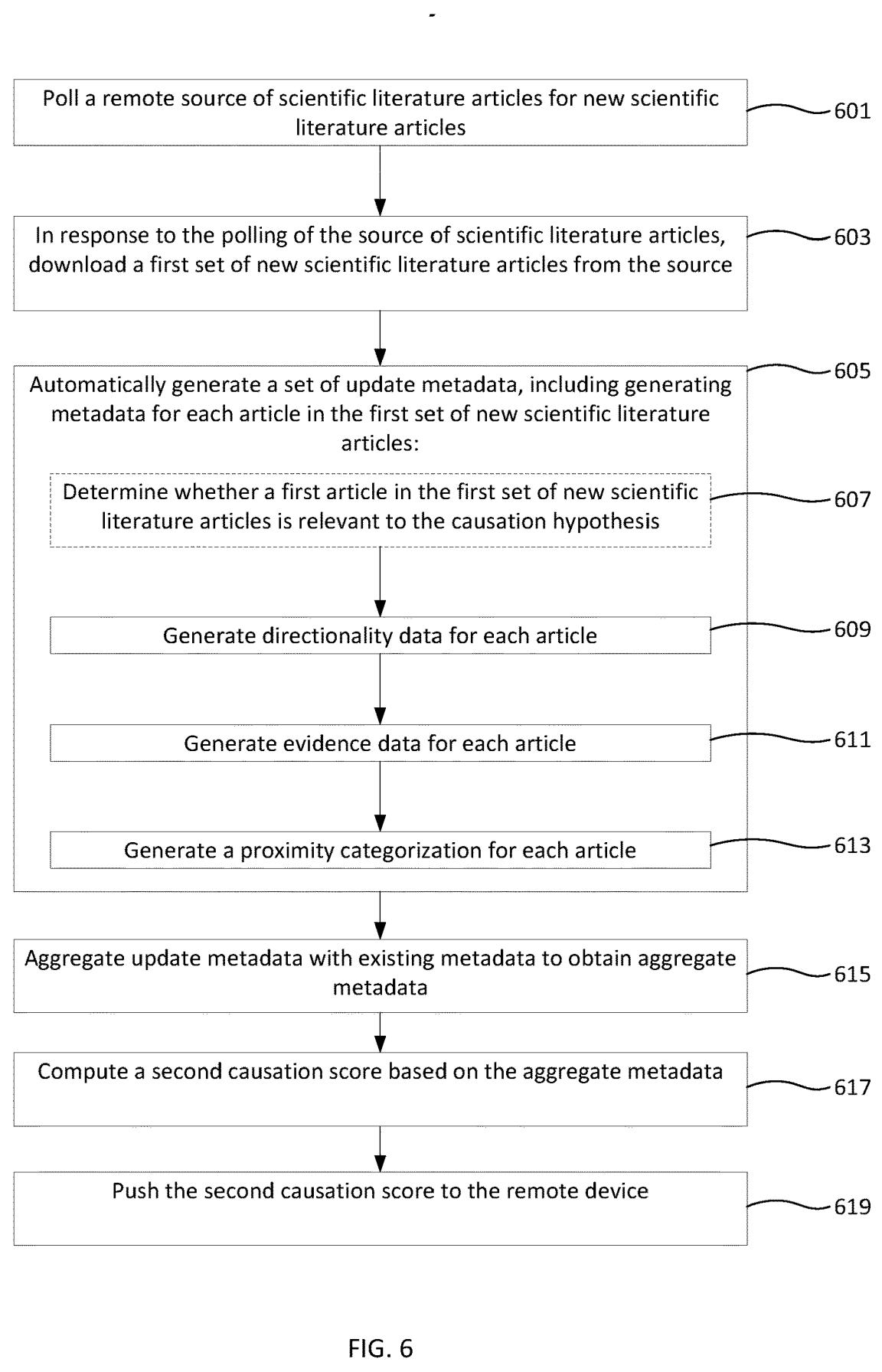

Poll a remote source of scientific literature articles for new scientific literature articles — 601

In response to the polling of the source of scientific literature articles, download a first set of new scientific literature articles from the source — 603

Automatically generate a set of update metadata, including generating metadata for each article in the first set of new scientific literature articles: — 605

Determine whether a first article in the first set of new scientific literature articles is relevant to the causation hypothesis — 607

Generate directionality data for each article — 609

Generate evidence data for each article — 611

Generate a proximity categorization for each article — 613

Aggregate update metadata with existing metadata to obtain aggregate metadata — 615

Compute a second causation score based on the aggregate metadata — 617

Push the second causation score to the remote device — 619

FIG. 6

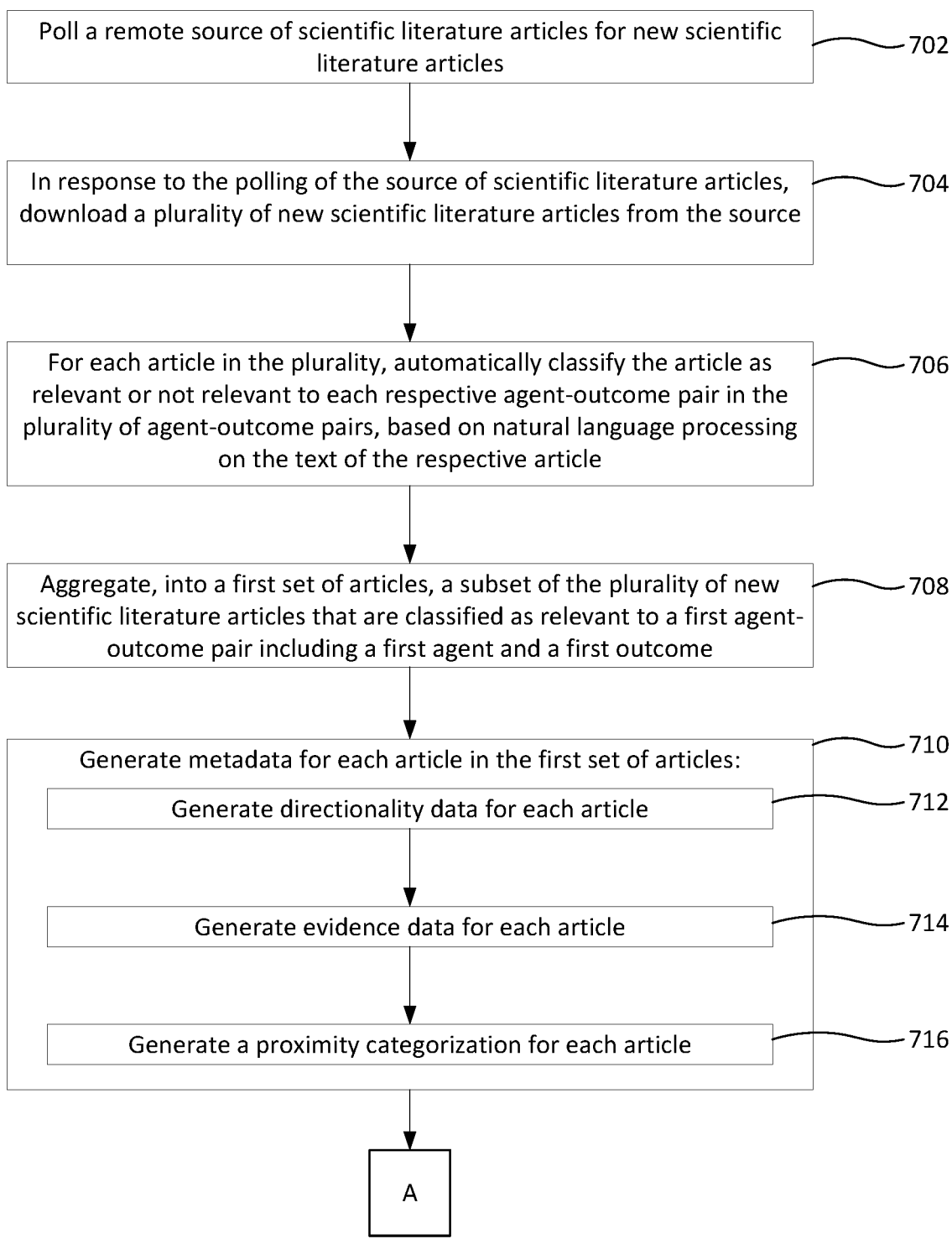

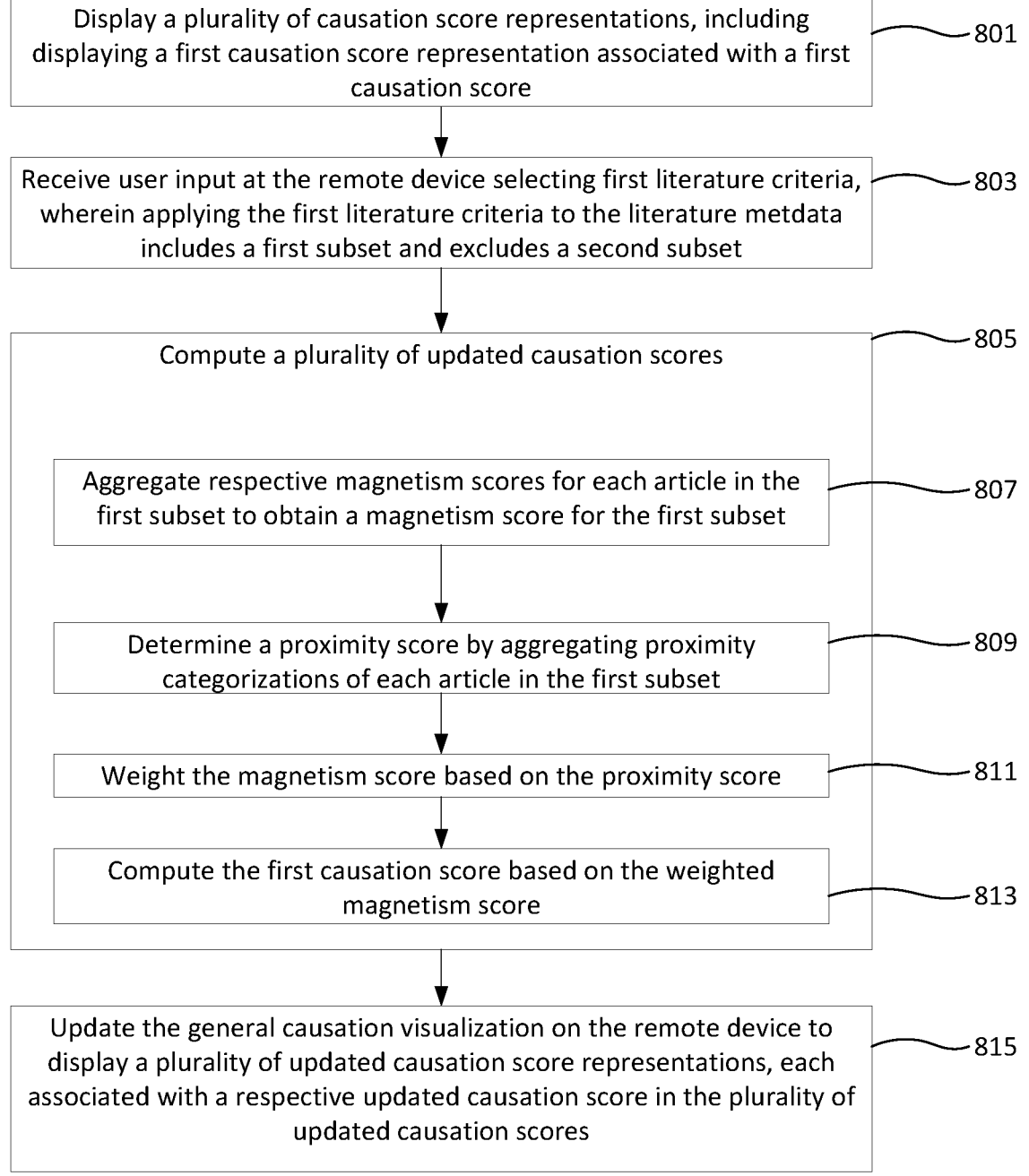

Display a plurality of causation score representations, including displaying a first causation score representation associated with a first causation score ⎯801

Receive user input at the remote device selecting first literature criteria, wherein applying the first literature criteria to the literature metdata includes a first subset and excludes a second subset ⎯803

Compute a plurality of updated causation scores ⎯805

Aggregate respective magnetism scores for each article in the first subset to obtain a magnetism score for the first subset ⎯807

Determine a proximity score by aggregating proximity categorizations of each article in the first subset ⎯809

Weight the magnetism score based on the proximity score ⎯811

Compute the first causation score based on the weighted magnetism score ⎯813

Update the general causation visualization on the remote device to display a plurality of updated causation score representations, each associated with a respective updated causation score in the plurality of updated causation scores ⎯815

FIG. 8

AUTOMATIC GENERATION OF SCIENTIFIC ARTICLE METADATA

CROSS-REFERENCE TO RELATED APPLICATIONS

This application is a continuation of U.S. patent application Ser. No. 17/248,498, entitled "AUTOMATIC GENERATION OF SCIENTIFIC ARTICLE METADATA" filed Jan. 27, 2021, which is a continuation of U.S. Pat. No. 10,909,323, entitled "AUTOMATIC GENERATION OF SCIENTIFIC ARTICLE METADATA" filed Mar. 9, 2020, which is a continuation of U.S. Pat. No. 10,585,990, entitled "LIVE UPDATING VISUALIZATION OF CAUSATION SCORES BASED ON SCIENTIFIC ARTICLE META-DATA" filed Mar. 15, 2019, all of which are hereby incorporated by reference in its entirety.

FIELD OF THE DISCLOSURE

This relates generally to methods of automatic generation of scientific article metadata for determining causation of an outcome by an agent.

SUMMARY OF THE INVENTION

U.S. Pat. No. 9,430,739, granted on Aug. 30, 2016, incorporated by reference herein in its entirety, is directed to a method of quantifying and visualizing general acceptance in scientific literature of a hypothesis that a particular agent causes a particular outcome. For example, based on meta-data of scientific articles published regarding the hypothesis that bisphenol A (BPA) causes reproductive injury in humans, a causation score can be calculated that represents the acceptance of such a hypothesis in the literature as a whole. Such a causation score can distill a literature into a single, actionable value, enabling the visualization of general acceptance over time and comparison of diverse risks on a common scale.

However, peer-reviewed journals publish hundreds of thousands of scientific articles every year, and human analysts may not be able to keep up with the pace to code the metadata on each article that feeds into the computation of causation scores for a myriad of agent-outcome hypotheses. Manually analyzing articles to feed into such an algorithm may require limiting both the pace of updating causation scores and the number of agent-outcome hypotheses that are monitored.

Examples of the disclosure are directed to systems and methods of using natural language processing techniques to automatically assign metadata to articles as they are published. The automatically-assigned metadata can then feed into the algorithms that calculate updated causation scores, powering live visualizations of the data that update automatically as new scientific articles become available.

Because human intervention may not be required, the pace of updating causation scores and visualizations may be limited only by the pace of the literature itself, and any number of agent-outcome hypotheses may be monitored. For example, a company can monitor all the chemicals it produces or uses for new advances in scientific literature that suggest increased risk of bodily injury as a result of exposure to those chemicals. Further, this dynamic calculation of causation scores makes it possible to filter and slice the literature in different ways to, for example, exclude low-impact journals or give a lower weight to industry-funded studies in the causation computations.

Although examples of the disclosure are described in terms of harmful outcomes such as cancer, examples are not so limited and can be instead directed to beneficial outcomes such as vaccination against a disease or a mixture of beneficial, harmful, and/or neutral outcomes. In addition, agents/outcomes may be in the fields of health, bodily injury, energy (e.g., wastewater injection), environmental, and/or property, among other possibilities.

BRIEF DESCRIPTION OF DRAWINGS

For a better understanding of the various described embodiments, reference should be made to the Detailed Description below, in conjunction with the following drawing in which like reference numerals refer to corresponding parts throughout the figures.

FIGS. 1A-1J illustrate an exemplary general causation visualization interface according to examples of the disclosure.

FIG. 6 is a flow diagram illustrating a method of updating a general causation visualization for an agent and an outcome in accordance with some embodiments.

FIGS. 7A-7B are flow diagrams illustrating a method of updating a set of causation scores, each respective causation score corresponding to one of a plurality of agent-outcome pairs in accordance with some embodiments.

FIG. 8 is a flow diagram illustrating a method of updating a general causation visualization in accordance with some embodiments.

DETAILED DESCRIPTION OF THE INVENTION

Figure 1A:
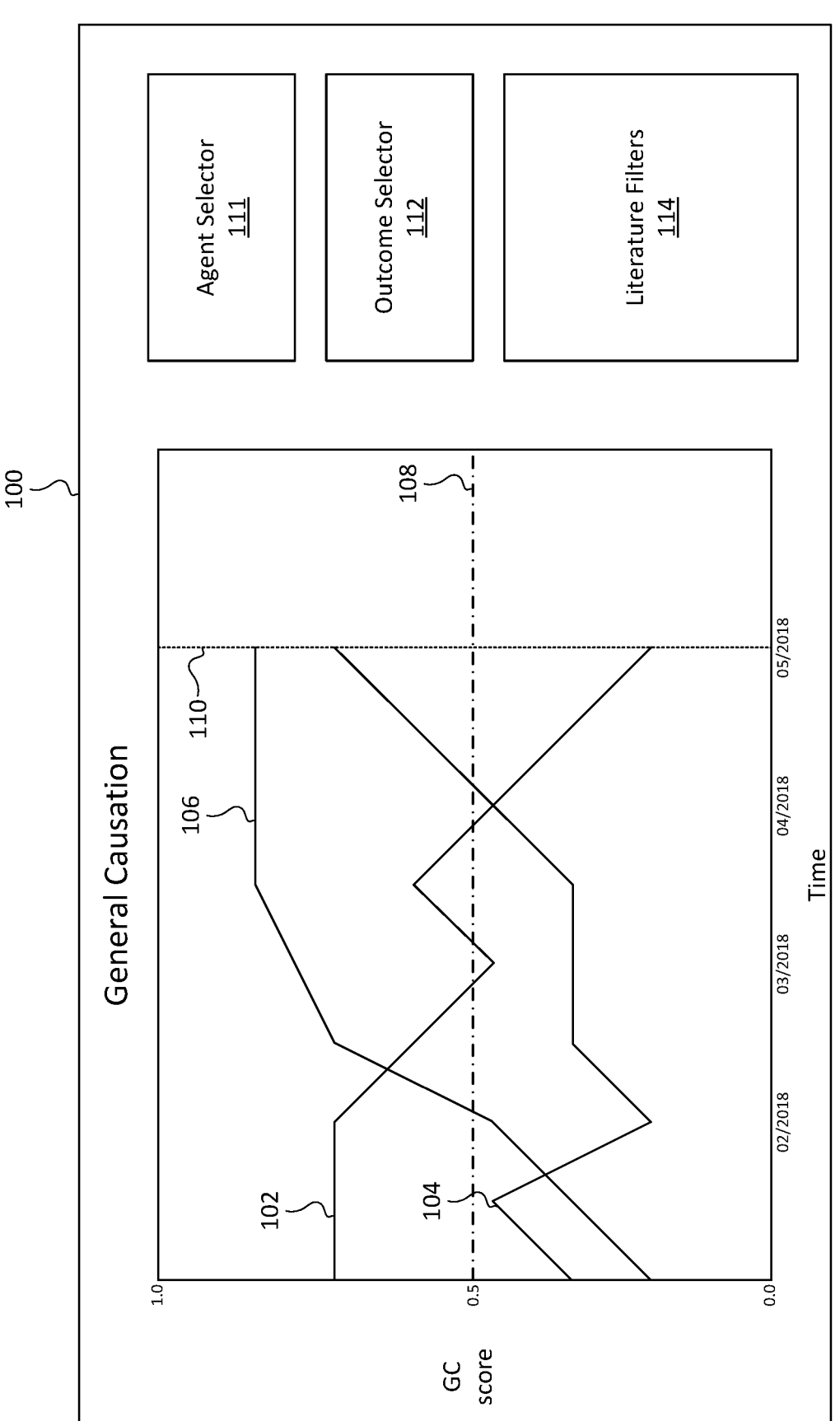

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

The methods and systems of the disclosure provide a technical benefit over the prior art by providing a more intuitive and seamless user interface for interacting with live-updating risk scores, thereby reducing the cognitive burden on a user when interacting with a user interface on the device and creating a more efficient human-machine interface. The interface is more intuitive in some examples because the user interface updates when new literature is published and new scores are calculated, as opposed to when a user requests an update via clicking a refresh button or similar.

For battery-operated electronic devices, increasing the efficiency of the user's interaction by only updating when new literature is published conserves power and increases the time between battery charges. Reducing a user's cognitive burden with a more efficient user interface also has battery-saving technical effects.

For portable devices with small screens, only updating when new literature is published may also conserve screen real estate, for example when each update is displayed in a historical list—a user's manual updates may create a long list to be displayed with little change over time, but only updating when literature is actually published may create a shorter list that can be displayed easily on a small screen.

The methods and systems of the disclosure also provide a technical benefit over the prior art in the form of a more technically secure computer system. An end-to-end automatic system as disclosed herein can remove at least two points where the system must interact with another party—embodiments herein disclose automating the metadata generation process so that no human interaction is needed for metadata generation, and because metadata is automatically updated as literature is published, a visual representation of causation scores can be automatically updated as well, without the user making a manual request for updated scores.

Embodiments of the disclosure thereby eliminate at least two potential vulnerability insertion points. That is, prior art systems require manual metadata coding, whereas in the present embodiments the same system that calculates the final causation score can generate the metadata as well without human interaction, resulting in a more secure computer system. Furthermore, the same system can push new scores and/or new visual representations of scores to remote devices for display, without needing to accept requests from remote devices for updated scores, again eliminating a potential vulnerability insertion point and resulting in a more secure computer system.

The methods and systems of the disclosure also provide a technical benefit over the prior art by enabling assessment of all agents (e.g., chemicals) at machine scale. The task of monitoring all the published scientific literature of all agents is simply impossible if manual reading of article abstracts and manual coding of metadata is required. A risk assessment user interface that updates live as new literature is published would not be possible without the examples disclosed herein.

Exemplary User Interfaces

FIGS. 1A-1J illustrate an exemplary general causation visualization interface according to examples of the disclosure. The user interfaces in these figures are used to illustrate the processes described below, including the processes described below with reference to FIGS. 6, 7A-7B, and 8.

FIGS. 1A-1H illustrate an exemplary general causation visualization interface 100 of an electronic device, presented on a display (e.g., display 208 of remote user 204). The general causation visualization interface includes one or more representations of a causation score. For example, FIG. 1A illustrates three curves 102, 104, and 106 representing causation scores over time for three different agent-outcome hypotheses. A point at a particular date along such a curve may represent a causation score as calculated based on the literature published as of that particular date.

For example, curve 102 may be a representation of the causation score over time for the hypothesis that BPA causes reproductive injury. In such an example, curve 102 might indicate that the scientific literature published as of February 2018 strongly supports the hypothesis that BPA causes reproductive injury (e.g., a causation score of 0.75), whereas the scientific literature published as of May 2018 still supports that hypothesis but the support is much weaker (e.g., a causation score of 0.25).

In some examples, each of the curves 102, 104, and 106 may correspond to different outcome hypotheses for the same agent. For example, curve 102 could correspond to the hypothesis that BPA causes reproductive injury, curve 104 could correspond to the hypothesis that BPA causes breast cancer, and curve 106 could correspond to the hypothesis that BPA causes developmental injury. In some examples, the outcome hypotheses represented by the curves displayed in the visualization can be selected via the outcome selector 112 (e.g., a combo box, check boxes, text field, slider, etc.) that a user can interact with via an input device (e.g., input device 206 of remote user 204, such as a keyboard, mouse, touchscreen, etc.). In such an example, only curves corresponding to outcome hypotheses selected via the outcome selector 112 would be displayed in the visualization, and any unselected or deselected outcomes would be removed from the visualization (or might not be displayed in the visualization in the first place, if it were never selected via the outcome selector). In some examples, a similar agent selector 111 may be displayed so that the user can select any combination of agent-outcome hypotheses to be displayed in one visualization (or multiple visualizations, in some examples).

Figure 1B:
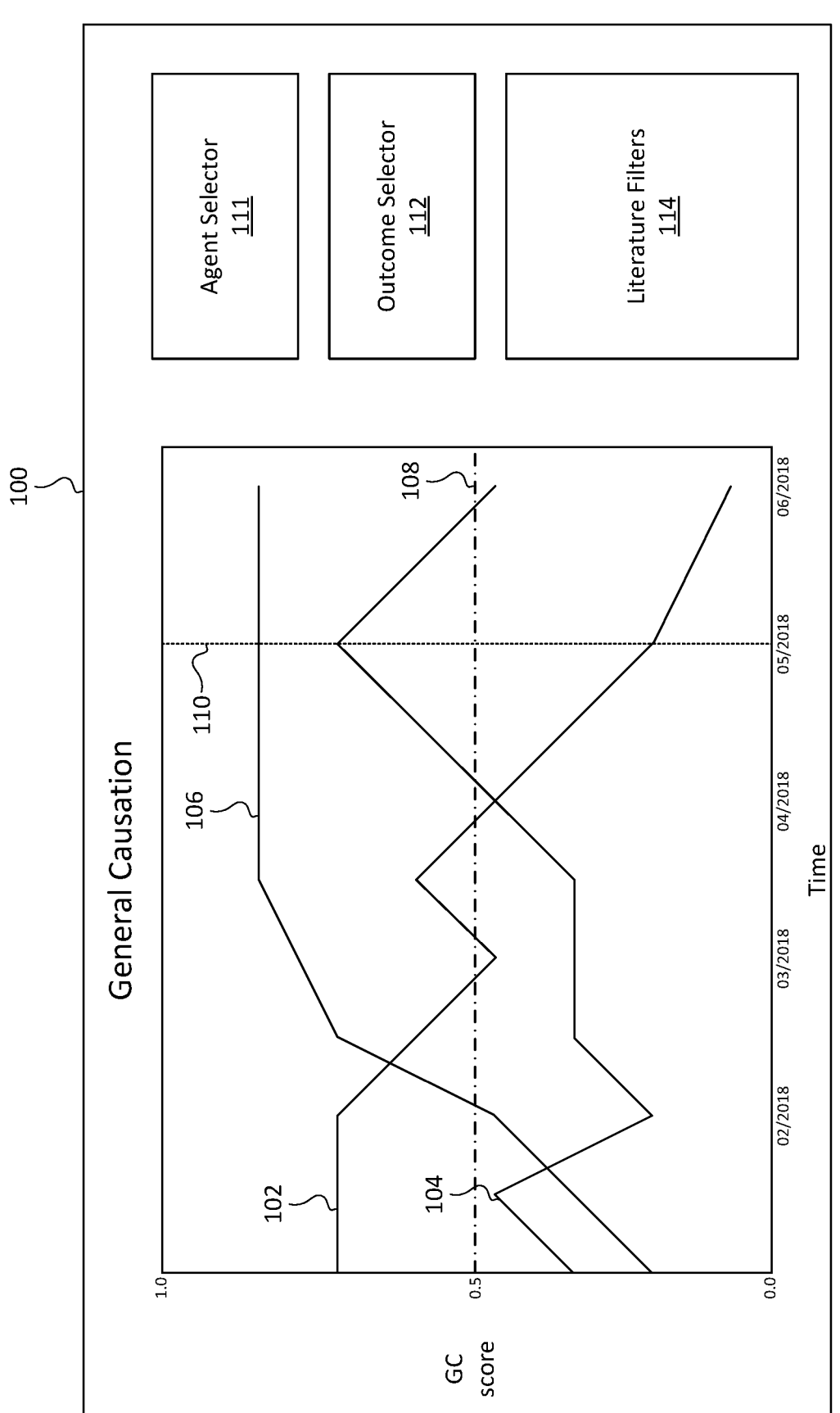

In some examples, a line 110 may be displayed to indicate a current date, with any points displayed to the left of the line 110 representing past causation scores and any points displayed to the right of the line 110 representing projected future causation scores, as illustrated in FIG. 1B (e.g., projecting future causation scores as disclosed in U.S. Pat. No. 9,430,739).

In some examples, a line 108 may represent a causation threshold (either set by a user or a predetermined threshold) that indicates to a user whether the causation score for a hypothesis has reached a notable level. For example, the threshold may be set so that if an agent's score goes above the threshold, the user should take a certain action (e.g., the user should remove the chemical from products/start researching alternatives, the user could expect regulatory action on the chemical, or the user could expect litigation over the use/production of the chemical). In some examples, if updating scores based on newly published and/or available literature results in a causation score rising above (or below, in some examples) a causation threshold, an alert may be generated and sent to the user (in some examples, this may be displayed in the visualization, and in some examples, it may be displayed even if the visualization is not displayed-it may be sent to the user's email, for example).

Figure 1C:
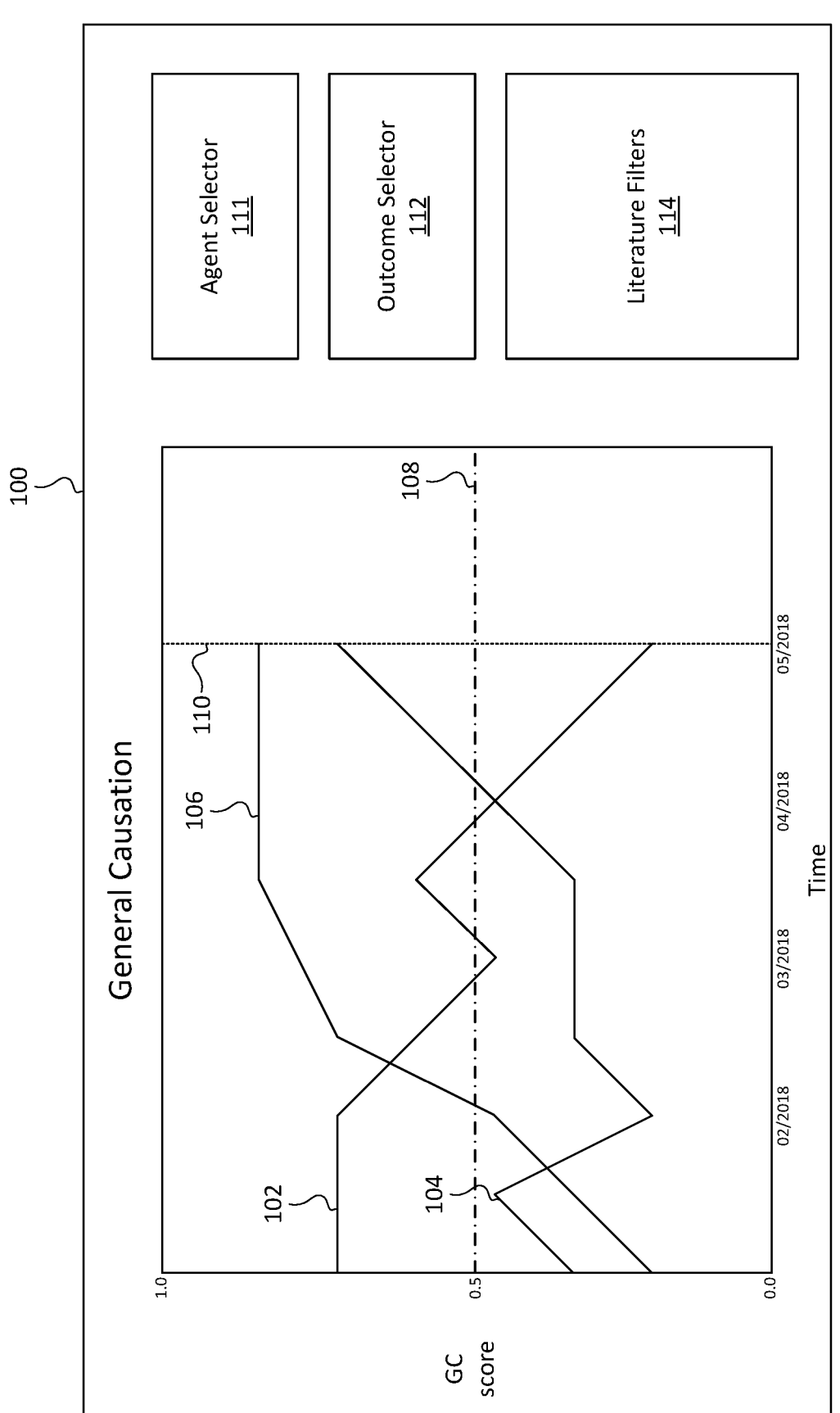
Figure 1D:
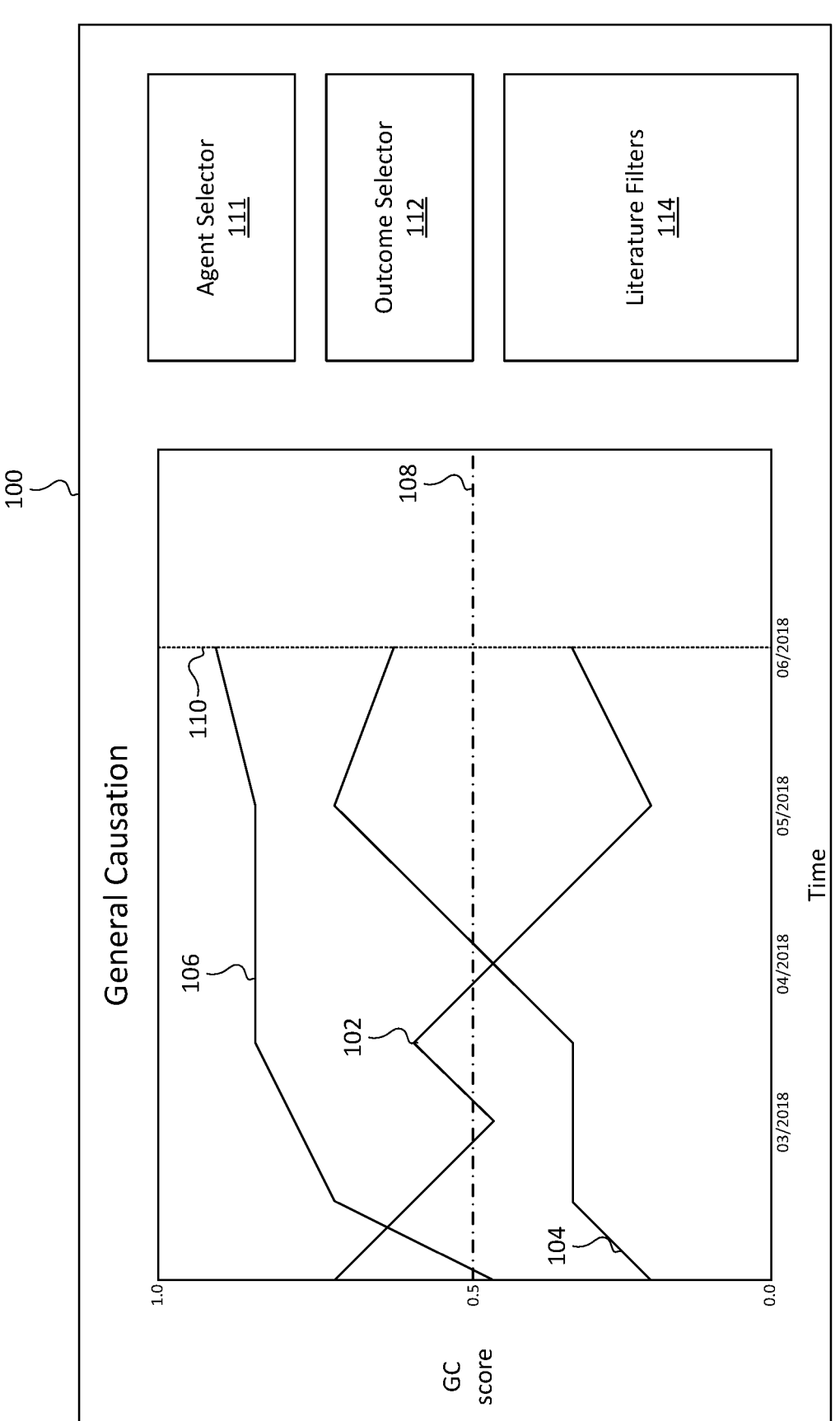

FIGS. 1C and 1D illustrate the automatic updating of an exemplary general causation visualization interface in response to the publication of new scientific literature relevant to the agent-outcome hypotheses represented visually by the curves 102, 104, and 106. FIG. 1D illustrates an updated general causation visualization that includes additional points on the curves 102, 104, and 106 representing causation scores based on the scientific literature published as of June 2018, whereas the causation scores in FIG. 1C may only represent scientific literature published as of May 2018. In some examples, a user may be viewing the visualization in FIG. 1C (e.g., a remote user 204) when new literature is published for June 2018. In response to the publication of new literature, the literature may be automatically coded with metadata and new scores may be generated and displayed as illustrated in FIG. 1D. In some examples, an animation may be generated and displayed to transition from the visualization in FIG. 1C to the updated visualization in FIG. 1D. For example, the curves 102, 104, and 106 and the dates on the time axis may move visually to the left as the points on the curves are displayed.

Figure 1E:
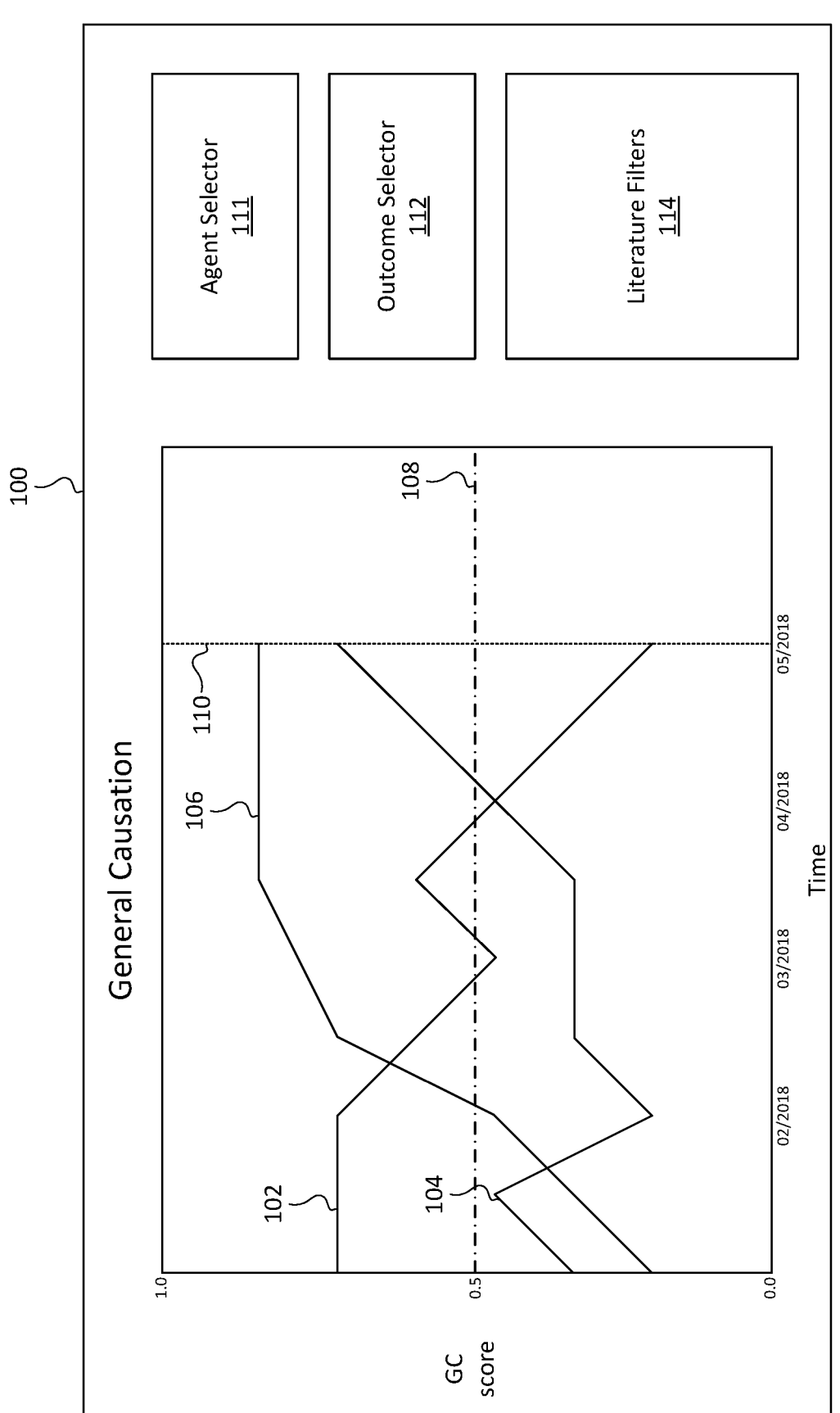
Figure 1F:
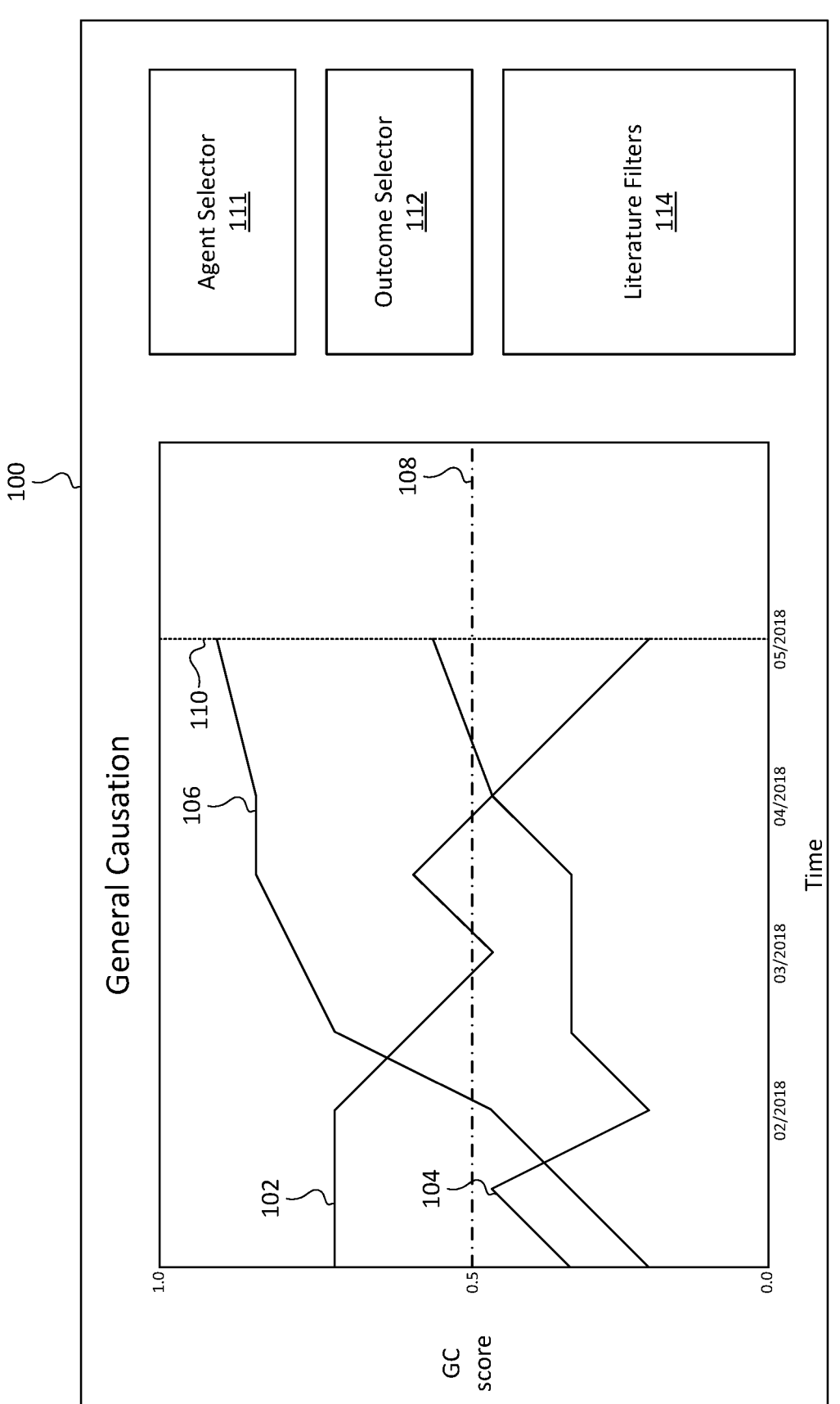

Whereas FIGS. 1C and 1D illustrate updating a causation visualization based on newly published literature for a new date (e.g., FIG. 1C illustrates literature published in May 2018 and earlier and FIG. 1D adds causation scores based on literature published in June 2018), examples of the disclosure also contemplate updating causation scores for previous dates based on newly available or accessed literature that was not available or accessed when causation scores were previously calculated. For example, a refresh of a literature source may result in additional articles that were published in previous months but were not previously available from the literature source, which may result in an update to the causation scores for previous months. An example of this is illustrated in FIGS. 1E and 1F. Between FIG. 1E and FIG. 1F, new articles published in May 2018 were available relevant to the hypotheses corresponding to curves 104 and 106. Accordingly, new causation scores may be calculated including information from the new articles and the visualization may be updated, as illustrated in FIG. 1F.

Figure 1G:
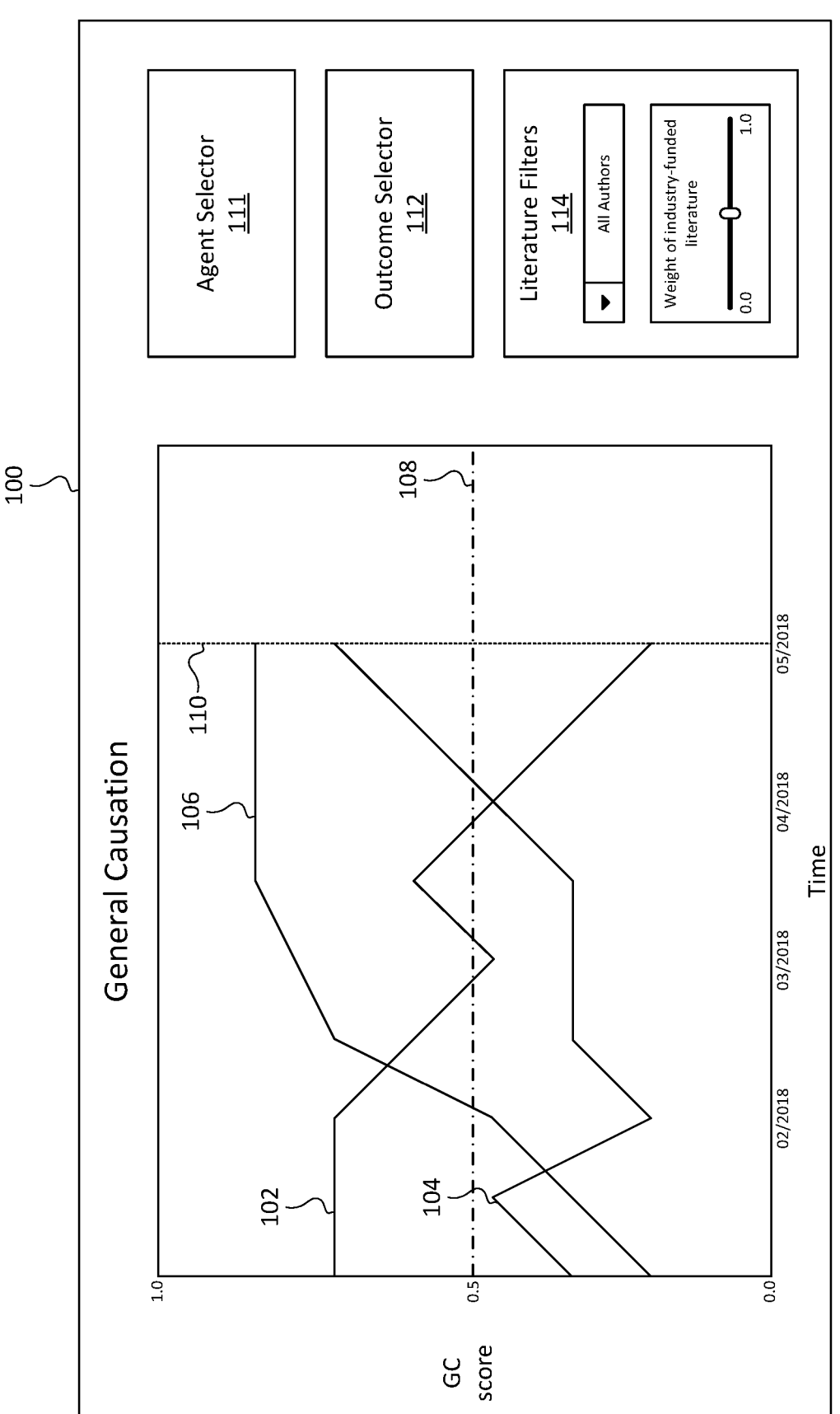
Figure 1H:
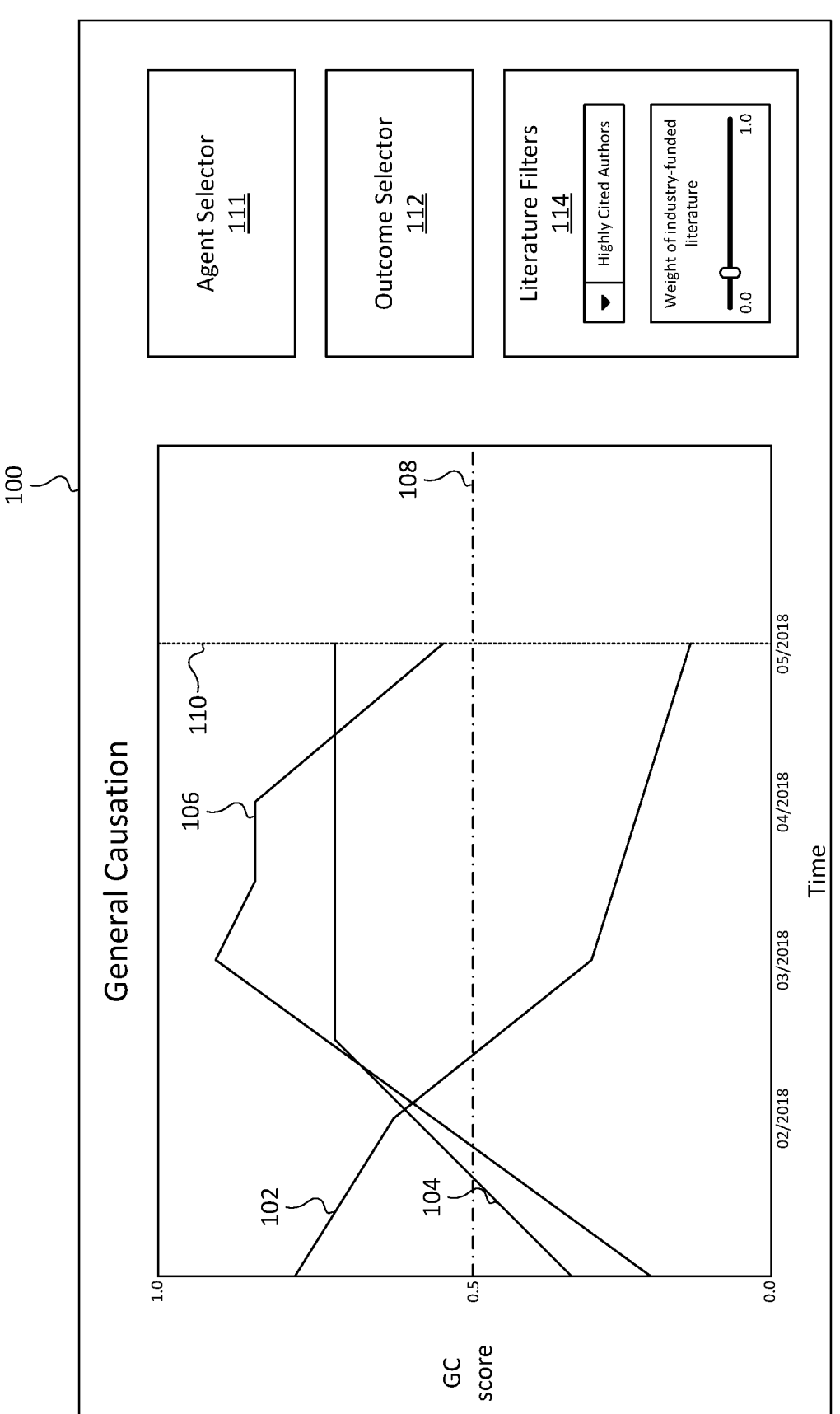

In some examples, the articles used to calculate the causation scores represented in the visualization may be selected based on literature filters 114 (e.g., a combo box, check boxes, text field, slider, etc.) applied by a user using an input device (e.g., input device 206 of remote user 204). For example, a user may filter the articles to include or exclude specific authors, specific journals, industry-funded research, journals based on a relevance or impact threshold, articles based on citation counts, etc. In some examples, a user may, instead of wholly filtering out certain articles, give them less weight in the calculation using the literature filters 114. For example, a slider may allow the user to give industry-funded research less weight in the causation score calculations than research that is funded by non-profit grants or government grants. FIGS. 1G-1H illustrate an exemplary filtering based on a change in literature filters 114. In FIG. 1G, the curves 102, 104, and 106 represent causation scores calculated based on metadata from articles written by all authors. In contrast, FIG. 1H illustrates, after user interaction with the combo box in literature filters 114 changing the selection from "All Authors" to "Highly Cited Authors" and changing the slider to give a lower weight to industry-funded literature, the curves 102, 104, and 106 are updated based on recalculated causation scores based on metadata only from a predetermined list of highly cited authors and giving a lower weight to industry-funded literature.

In some examples, confidence values may also be displayed in association with causation scores, and literature filters 114 may allow a user to filter based on confidence values (e.g., only include literature having metadata with confidence values at or above 75). For example, a confidence value associated with a causation score may indicate a level of confidence that the causation score accurately represents the literature based on outputs from classifiers and other machine learning techniques (e.g., the classifiers illustrated in FIGS. 4 and 5A-5D, among other possibilities). In some examples, a confidence value may be given as 100 (i.e., a maximum possible confidence value) if a human analyst has reviewed the automatically generated metadata used in calculation of the causation score or a human analyst manually generated the metadata. In some examples, a confidence value may be calculated and displayed on an agent level, an agent-outcome level, an article level (e.g., reporting confidence in the metadata generated for a particular article), and/or a metadata level (e.g., reporting a confidence in the evidence data for a particular article or the directionality data for a particular article), among other possibilities.

FIGS. 1I-1J illustrate an exemplary live-updating list of causation scores according to examples of the disclosure. In these examples, the representation of a causation score includes a textual representation (e.g., a number) displayed alongside a textual representation of the corresponding agent. For example, FIG. 1I includes a general causation visualization including an ordered list of causation scores, listed from highest to lowest. An updated visualization may be generated and displayed (e.g., after new articles are published) as illustrated in FIG. 1J. In this example, the top score of 0.90 for bisphenol A is updated to 0.95 and this score remains at the top of the list, whereas DEHP remains at 0.88 but moves to a lower position in the list because the score for lead is updated from 0.82 to 0.90, moving lead to a higher position in the list. In some examples, updating the visualization may include animating the movement of agents and/or scores to a different position in the list, changing colors of the agent and/or score that correspond to different risk levels (e.g., changing from green to red when the score associated with an agent becomes higher), or changing the size of an agent and/or score in accordance with the score's magnitude (e.g., a higher score results in a larger size of the representation of the agent and/or score in the visualization, such as in a word cloud).

Flow of Data Between Devices

FIGS. 2A-2D illustrate an exemplary flow of data between devices according to examples of the disclosure. For example, a device 202 may poll a literature source 200 for new articles, and download new articles from the literature source. After generating metadata for the new articles and calculating updated causation scores based on the metadata from existing articles and new articles, device 202 may respond to a request for one or more updated scores from remote user 204 by pushing one or more updated scores to the remote user. A causation visualization displayed on display 208 may be updated to display representations of the updated scores received from device 202.

A literature source 200, a device 202, and a remote user 204 are all connected via a network (e.g., the internet or a combination of one or more public and/or private networks; in some examples, the literature source 200 and device 202 may be connected over a first network and device 202 and remote user 204 may be connected over a second network, different from the first; in some examples, the literature source 200 and device 202 may be different physical or logical components of a single device; in some examples, the literature source 200, the device 202, and the remote user 204 may all be different physical or logical components of a single device).

In some examples, a literature source 200 may be a website, a public server, or a private server, among other possibilities, that provides scientific literature, articles, abstracts, and/or metadata. Examples of literature sources include PubMed, Google Scholar, or a private literature database, among other possibilities.

In some examples, device 202 may be an electronic device including a processor that performs one or more steps of methods disclosed herein. In some examples, device 202 may be a single device or one or more devices working in concert, communicating over network 206 or another public and/or private network. For example, a first device may compute one or more causation scores and a second device may generate a visual representation of the score such as a textual representation, an image, etc.

In some examples, the remote user 204 may be an end user device such as a smartphone, desktop computer, laptop, etc. The remote user 204 may include a display 208 (e.g., a monitor, a touchscreen, a laptop screen, etc.) and/or an input device 210 (e.g., keyboard, mouse, touchscreen, etc.). Although only one remote user 204 is depicted in FIGS. 2A-2D, a plurality of remote users may have similar interactions with device 202.

Figure 2A:
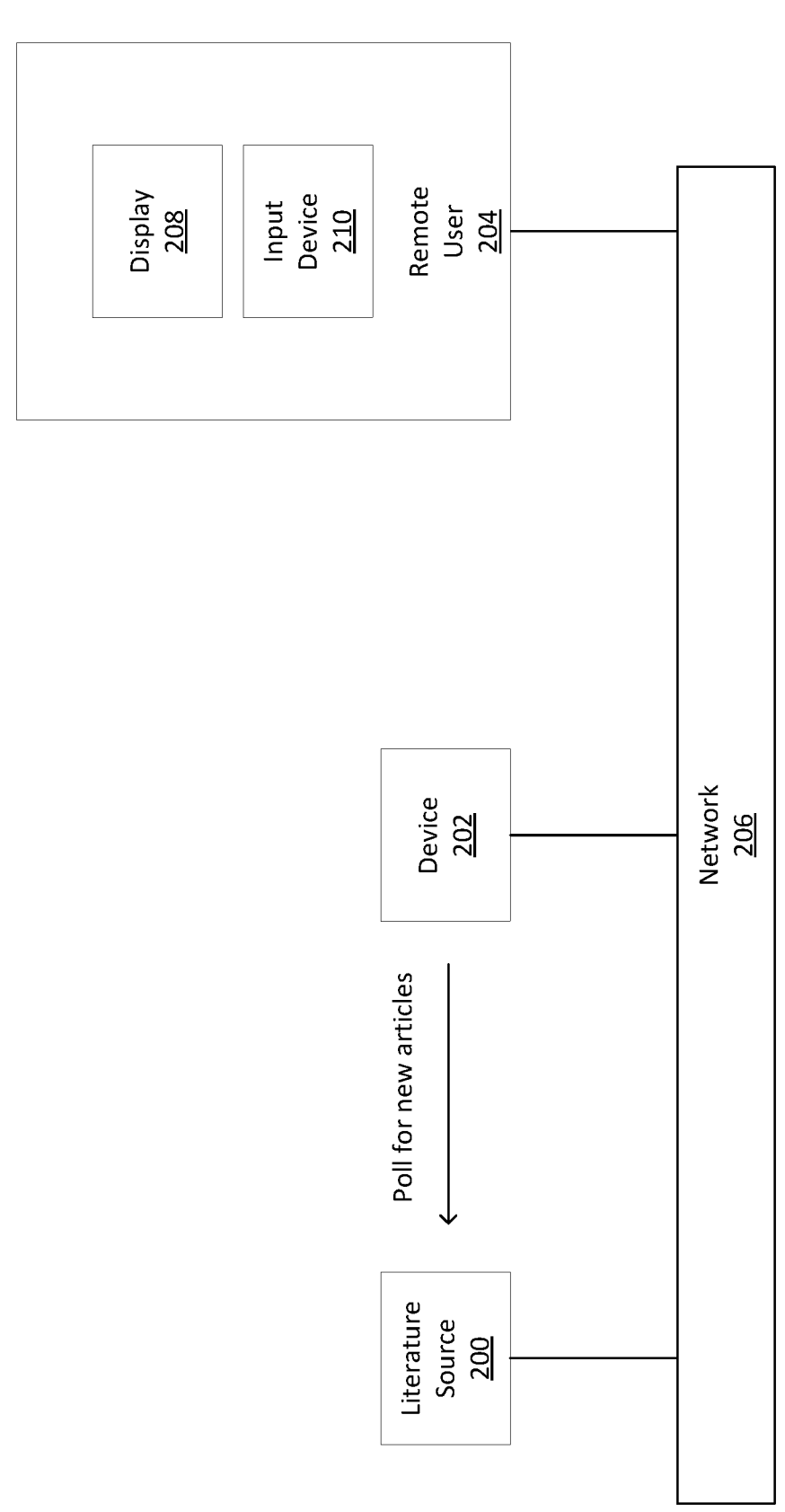
FIGS. 2A-2D illustrate an exemplary flow of data between devices according to examples of the disclosure.

FIG. 2A illustrates device 202 polling a literature source 200 for new articles. For example, device 202 may send a request to literature source 200 (e.g., an API call via HTTP or other web API method, among other possibilities) regarding the availability of new articles. In some examples, the request may be: a request to determine whether there are any new articles, a request to determine how many new articles there are, a request to download only new articles, and/or a request to download a specific set of articles (e.g., all articles published/made available in the last month, etc.), among other possibilities. In some examples, device 202 may poll the literature source 200 according to a predetermined time interval, such as daily, weekly, monthly, etc. In some examples, device 202 may poll the literature source 200 for new articles only in response to an indication that new articles are available, such as based on a notification from literature source 200 that new articles are available.

Figure 2B:
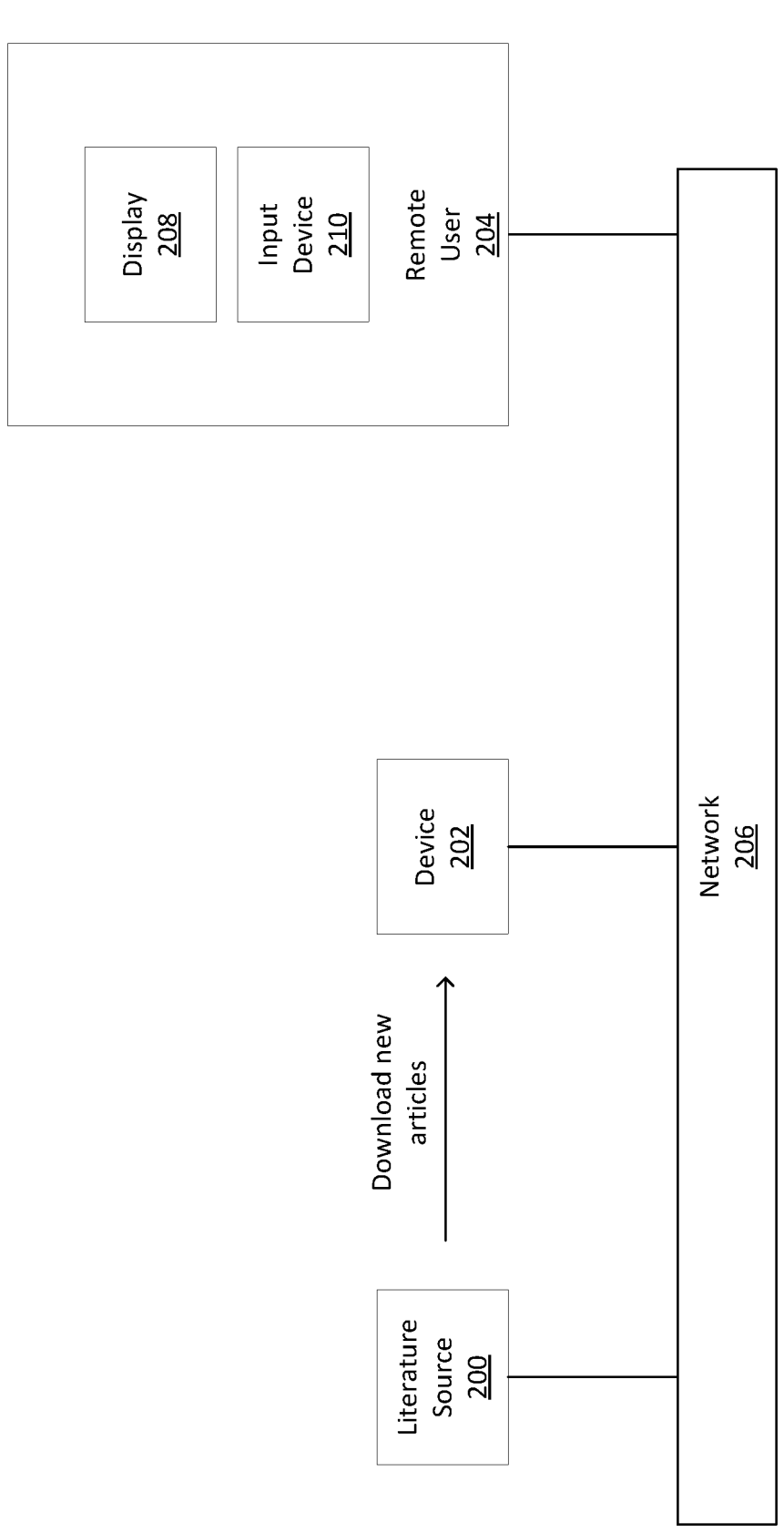

FIG. 2B illustrates device 202 downloading new articles from literature source 200. In some examples, these new articles may be sent by the literature source 200 in response to the request illustrated in FIG. 2A, and in some examples, the downloading may be separate. In some examples, the new articles may be included in a larger set of articles, including old articles, that are all downloaded at once. In some examples, downloading new articles may consist of downloading abstracts and/or other metadata, without downloading full articles. In some examples, updates to previously retrieved abstracts and/or metadata may be download instead and/or in addition to downloading new articles, and causation scores may be updated accordingly.

Figure 2C:
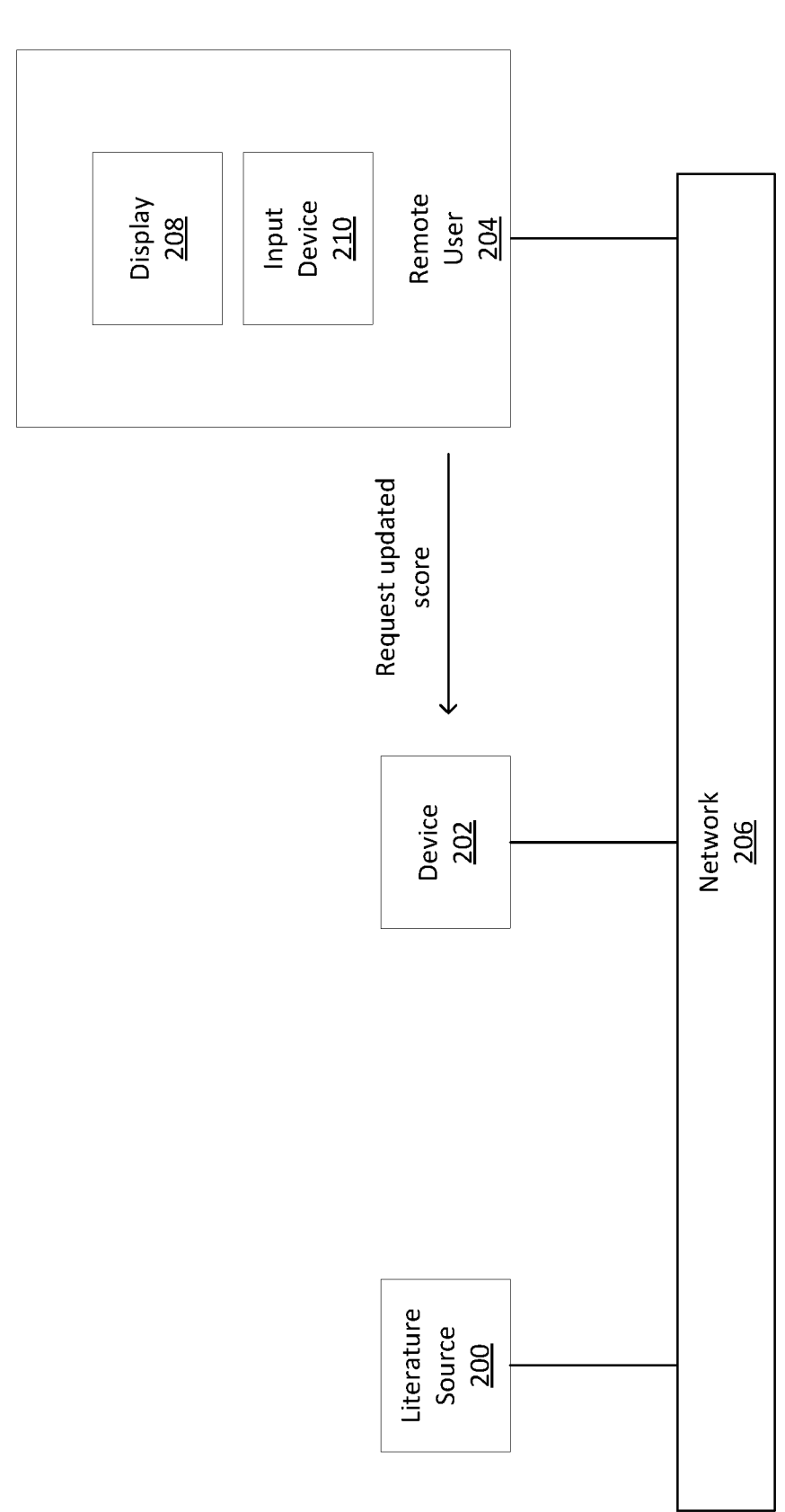

FIG. 2C illustrates remote user 204 requesting an updated score from device 202. In some examples, such a request may be sent in response to user input via the input device 210. In some examples, such a request may be sent at regular intervals (e.g., every minute) while a user is viewing a causation visualization. In some examples, requests for updated scores may not be sent by remote user 204 and instead device 202 may push updated scores to remote user 204 without being so prompted.

Figure 2D:
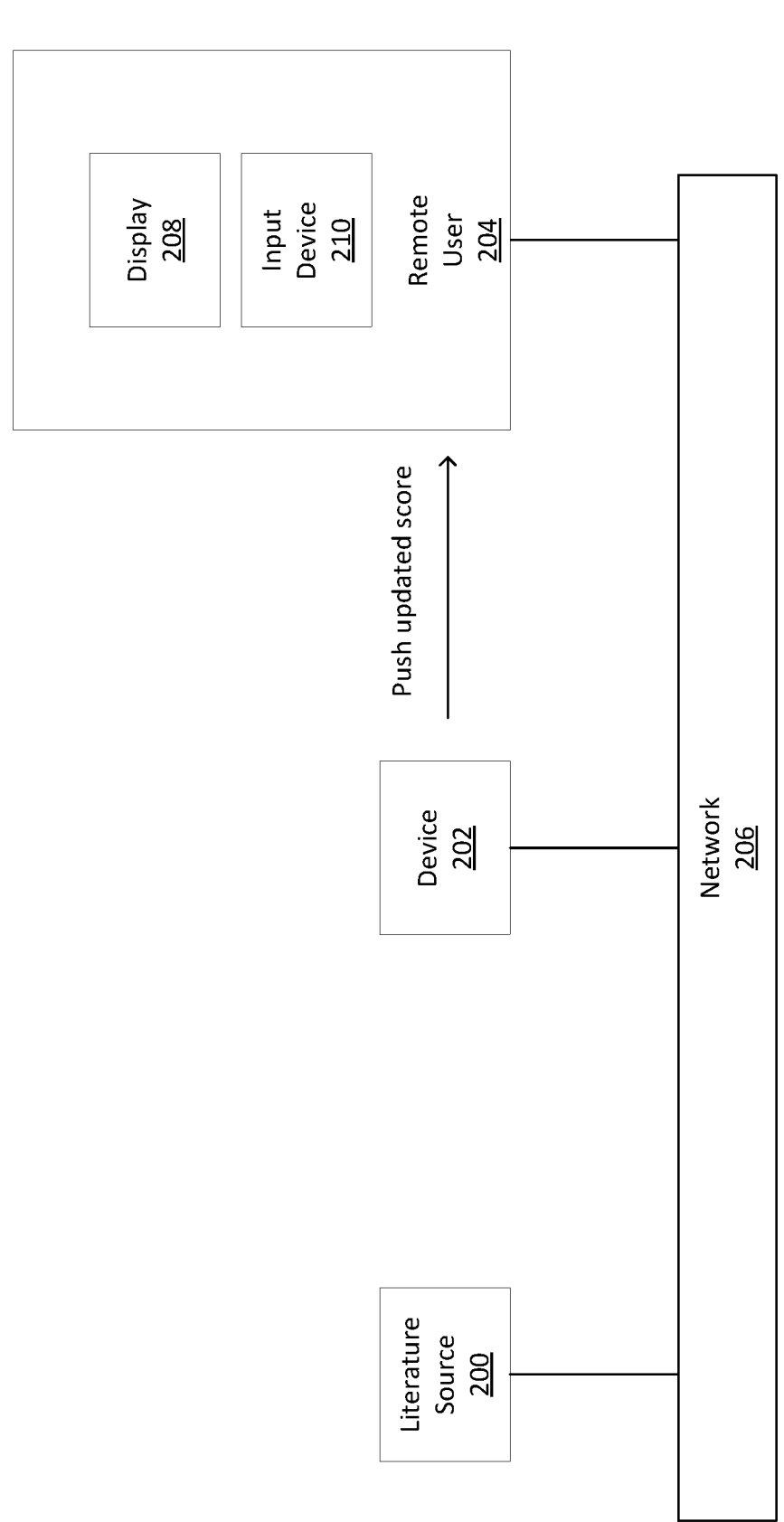

FIG. 2D illustrates device 202 pushing an updated score to remote user 204. In some examples, device 202 may push one or more updated scores to remote user 204 without receiving a request for an updated score from device 202, and in other examples pushing the updated scores may be in response to a request for the updated score from remote user 204. In some examples, if a request for updated scores is received, device 202 may only push updated scores if scores have, in fact, been updated since the last set of scores were sent to remote user 204. In some examples, pushing updated scores may consist of pushing representations of updated scores (e.g., curves, images, and/or text, among other possibilities).

Calculating General Causation from Metadata

A causation score may be determined based on metadata of a corpus of scientific publications. The metadata may be associated with a particular agent and a particular outcome. For example, a corpus of scientific publications may be annotated with respect to the agent bisphenol A (BPA) and the outcome breast cancer, and the metadata would be associated with that agent/outcome pair. Such metadata can include relevance data, directionality data, evidence data, proximity data, and/or magnitude data, among other possibilities.

Relevance data can indicate whether an article is relevant to a hypothesis that an agent causes an outcome. For example, a 1 can indicate that the article is relevant to the hypothesis, and a 0 can indicate that the article is irrelevant to the hypothesis. In some examples, relevance data may be on a scale (e.g., from 0 to 1) indicating a level of relevance, where a higher number indicates a relatively more relevant article than a lower number. In some examples, only metadata for articles having relevance data at or above a certain threshold (e.g., 0.5, 0.75, or 1.0) with respect to a hypothesis may be included in calculating a causation score for that hypothesis. In some examples, the metadata's contribution to the causation score calculation may be weighted based on the relevance data.

Directionality data can indicate whether an article supports or rejects a hypothesis that the agent causes the outcome. For example, a 1 can indicate that the article supports the hypothesis, a −1 can indicate that the article rejects the hypothesis, and a 0 can indicate that the article is uncertain on the hypothesis.

Evidence data can indicate the evidence level of an article, that is, how well the methodology of the article can demonstrate a causal relationship. For example, a randomized, controlled trial can demonstrate a causal relationship well. Such an article may have a higher value than an uncontrolled observational study, which may not demonstrate a causal relationship as well. Evidence level may be annotated based on a plurality of categories of study design, and each category may be associated with a value on the interval $[0,1]$, reflective of the category's relative importance in informing the causal hypothesis for a specified agent and outcome.

Proximity data can indicate whether the evidence provided in the article is direct evidence or indirect evidence that an agent causes an outcome in a target population. In some examples, this may include a measure of how close the model used in the article is to the target population. For example, if the target population is humans, the hypothesis of interest is whether the agent causes the outcome in humans. In such a case, an animal study would have a lower proximity value than a human study, because the humans in the study are more similar biologically to the target population and thus human evidence is more direct than animal evidence. In some examples, proximity data may comprise a simple categorization of each study as either human, animal, or in vitro (cell); in some examples, the proximity data may comprise a simple categorization of each study as either indirect evidence or direct evidence (e.g., if the evidence in the article is not a study on a living being, but rather interrogating, for example, whether wastewater injection causes environmental damage). The proximity data may only include articles/abstracts that are relevant to the causal hypothesis for the specified agent and outcome. In some examples, proximity data may not be used at all (e.g., evidence level data may have enough explanatory power to capture the same information conveyed by proximity data).

Magnitude data can quantify the strength of the association between an agent and an outcome as observed in an article or abstract. For example, magnitude data can include odds ratios, statistical significance, risk ratios, and/or standardized mortality ratios, among other possibilities.

The causation score may be further determined based on data that is not specific to an agent/outcome pair. For example, the causation score may be determined based on the quality of the journals in which the relevant literature was published. This can be determined on the basis of the journal, the author(s) of the article, the lab which conducted the study described in the article, and/or the corporation that funded the study, among other possibilities. Literature impact data (also referred to as impact factors) can be calculated, or in some examples literature impact data may be obtained from a database of such information.

Figure 3A:
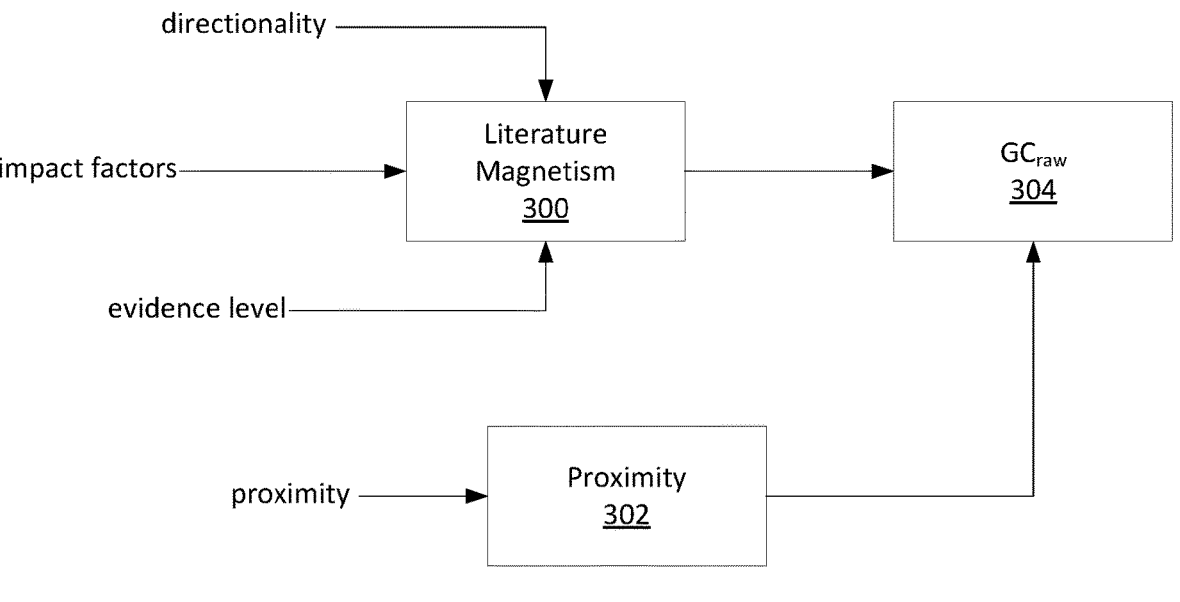
FIGS. 3A and 3B illustrate an exemplary method of determining a causation score according to examples of the disclosure.
Figure 3B:
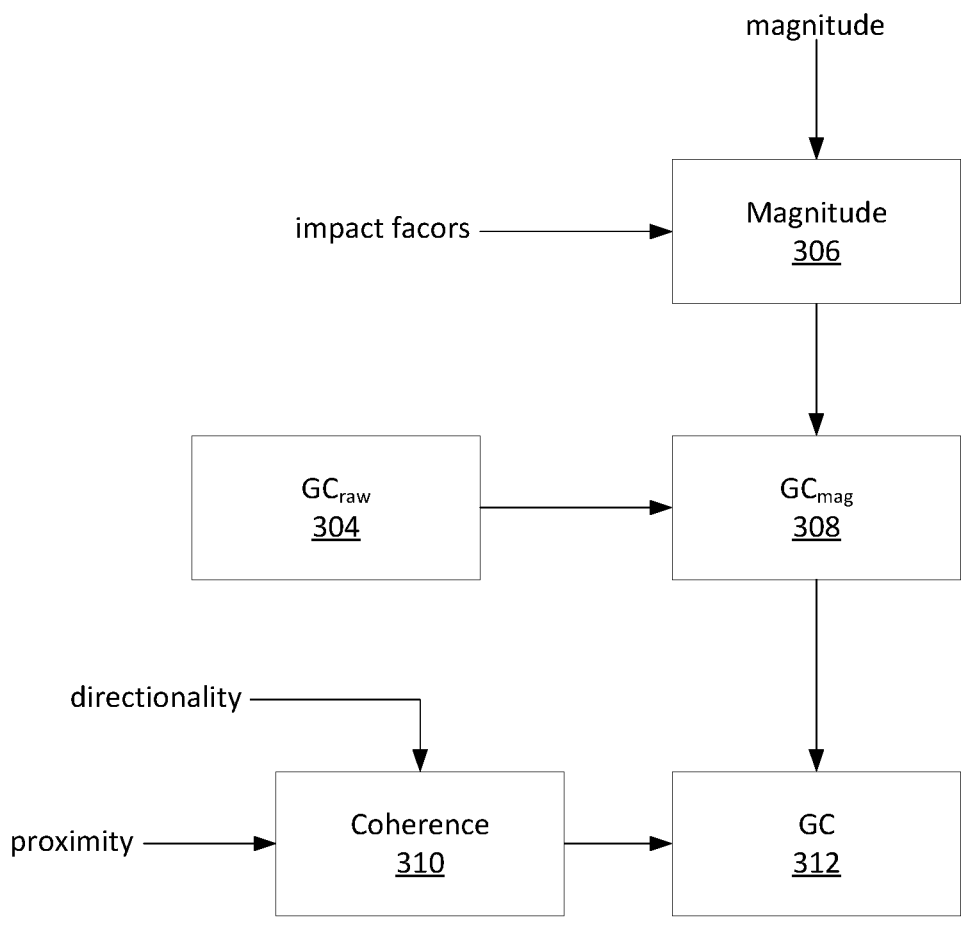

FIGS. 3A and 3B illustrate an exemplary method of determining a causation score according to examples of the disclosure. A literature magnetism score (300) may be calculated based on directionality data, evidence data, and/or impact factors, among other possibilities. A literature magnetism score may indicate an aggregate "direction" of the relevant scientific literature with respect to causation for a given agent/outcome hypothesis. In some examples, the literature magnetism score may be calculated based on the following equation:

$$LM_{raw} = \sum_i \sqrt{IF_i} \cdot EL_i \cdot d_i \qquad (1)$$

where, for each article or abstract i, IF may be its journal impact factor, EL may be its evidence level, and d may be its directionality. $LM_{row}$ may be unbounded, with positive scores reflecting overall support for causation and negative scores reflecting a lack of support. The magnetism score may be constrained to the interval $[-1,1]$ using a scaled sigmoidal squashing function, such as hyperbolic tangent. In some examples, the following equation may be used:

$$LM = \tanh(\alpha LM_{raw}) \qquad (2)$$

The constant $\alpha$ may be a tuning parameter used to set the active range of the magnetism score, that is, over what range of scores will adding more publications continue to affect the final score. In some examples, $\alpha$ may be equal to 0.2. Interpreting $d_i$ as a two-state choice parameter, a modeling analogy can be drawn to mean field theory and the mean field energy of scientific consensus can be calculated. The effect of this analogy is to apply a hyperbolic tangent function to the raw literature magnetism score as illustrated in equation 2. Although examples are described with respect to a literature magnetism score, a magnetism score may take into account other evidence supporting or rejecting a causation hypothesis and, in fact, may be based on no scientific literature in some examples. In some examples, a magnetism score may be further based on one or more other data sets, such as magnitude data. In some examples, the metadata's contribution to the causation score calculation may be weighted based on the relevance data. For example, if an article is 50% likely to be relevant then its weight is shifted downward by half in the magnetism calculation (equation 2) and/or in the proximity calculation (equation 3 below).

A proximity score (302) may be determined based on at least proximity data. The proximity score can indicate the directness of the aggregate evidence in the scientific literature, as discussed above. In some examples, the proximity score may be calculated based on the following equation:

$$P = \frac{1}{1 + e^{-\beta(x-0.5)}}, \text{ where } x = \frac{\text{human} + \text{animal}/2}{\text{human} + \text{animal} + \text{in vitro}/4} \qquad (3)$$

The variables human, animal, and in vitro may indicate the total number of articles/abstracts categorized in the proximity data as human, animal, and in vitro (cell), respectively. The constant $\beta$ may establish the steepness of a transition zone and the width of a "flat" area of P when x is near 0 or 1. In some examples, $\beta$ may be equal to 15. In this example, a literature composed entirely of human studies would receive a proximity score of 1.0; whereas one with all animal studies would receive a score of 0.5, and literatures absent human studies would be bounded at 0.5 or below. In some examples, a proximity score may be calculated based on categories other than human, animal, and in vitro (cell)—for example, a proximity score may be calculated based on direct evidence and indirect evidence categories, or the like.

A raw causation score $GC_{raw}$ (304) may be calculated based on the magnetism score and the proximity score. In some examples, the raw causation score may be calculated as the simple product of the magnetism score and the proximity score. In some examples, the raw causation score may be calculated as the product $LM^a \cdot P^b$, where a and b are constant parameters. In some examples, the raw causation score may be an intermediate result further modified as described with respect to FIG. 3B. However, in other examples, the raw causation score may be determined to be the causation score for the agent/outcome hypothesis and accepted as a final result.

In FIG. 3B, a magnitude score (306) may be computed based on magnitude data and literature impact data. The magnitude score may indicate aggregate effect size, conditional on study quality and statistical significance. In some examples, the magnitude score may be calculated based on the following equation:

$$M = \tanh\left(\frac{x-2}{\sqrt{2}}\right), \text{ where } x = \frac{\sum_i \sqrt{IF_i \cdot b_i} \cdot OR_i}{\sum_i \sqrt{IF_i \cdot b_i}} \qquad (4)$$

where, for each article or abstract i, IF may be its journal impact factor, OR may be its odds ratio, and b may indicate statistical significance of the odds ratio (for example, $b_i$ may be equal to 1 if the $OR_i$ is statistically significant or 0.25 if non-significant).

A causation score $GC_{mog}$ (308) may be calculated based on a raw causation score $GC_{raw}$ (304) moderated by the calculated magnitude score M (306). For example, $GC_{mag}$ may be calculated according to the following conditions:

For positive $GC_{raw}$/positive M, $\qquad (5)$ $GC_{mag} = GC_{raw} + M(1 - GC_{raw})$ For positive $GC_{raw}$/negative M, $\qquad (6)$ $GC_{mag} = GC_{raw}(1 + M)$ For negative $GC_{raw}$/positive M, $\qquad (7)$ $GC_{mag} = GC_{raw}(1 - M)$ For negative $GC_{raw}$/negative M, $\qquad (8)$ $GC_{mag} = GC_{raw} + M(1 + GC_{raw})$ Finally, a coherence score may be computed based on directionality data and/or proximity data, among other possibilities. For example, count data may be tabulated to obtain, for each proximity category, the number of positive studies and the number of negative studies (in some examples, additional categories of directionality may be used). Then, test statistics (e.g., chi-squared) may be calculated based on the count data to determine whether the ratio of positive to negative studies is statistically different across the proximity categories. The test may yield a chi-squared statistic corresponding to a p-value, and the coherence score may be calculated by the following equation, among other possibilities:

$$C = \tanh(kp + \tan^{-1} m) \qquad (9)$$

where p may be the p-value calculated as described above, and k and m may be parameters determining the steepness of the function and its offset. The coherence score may then be combined with the magnitude-adjusted causation score $GC_{mag}$ to compute a causation score GC (312). For example, the magnitude-adjusted causation score may be weighted by the coherence score, although other combinations are possible.

Generating Article Metadata from Abstract Text

Figure 4:
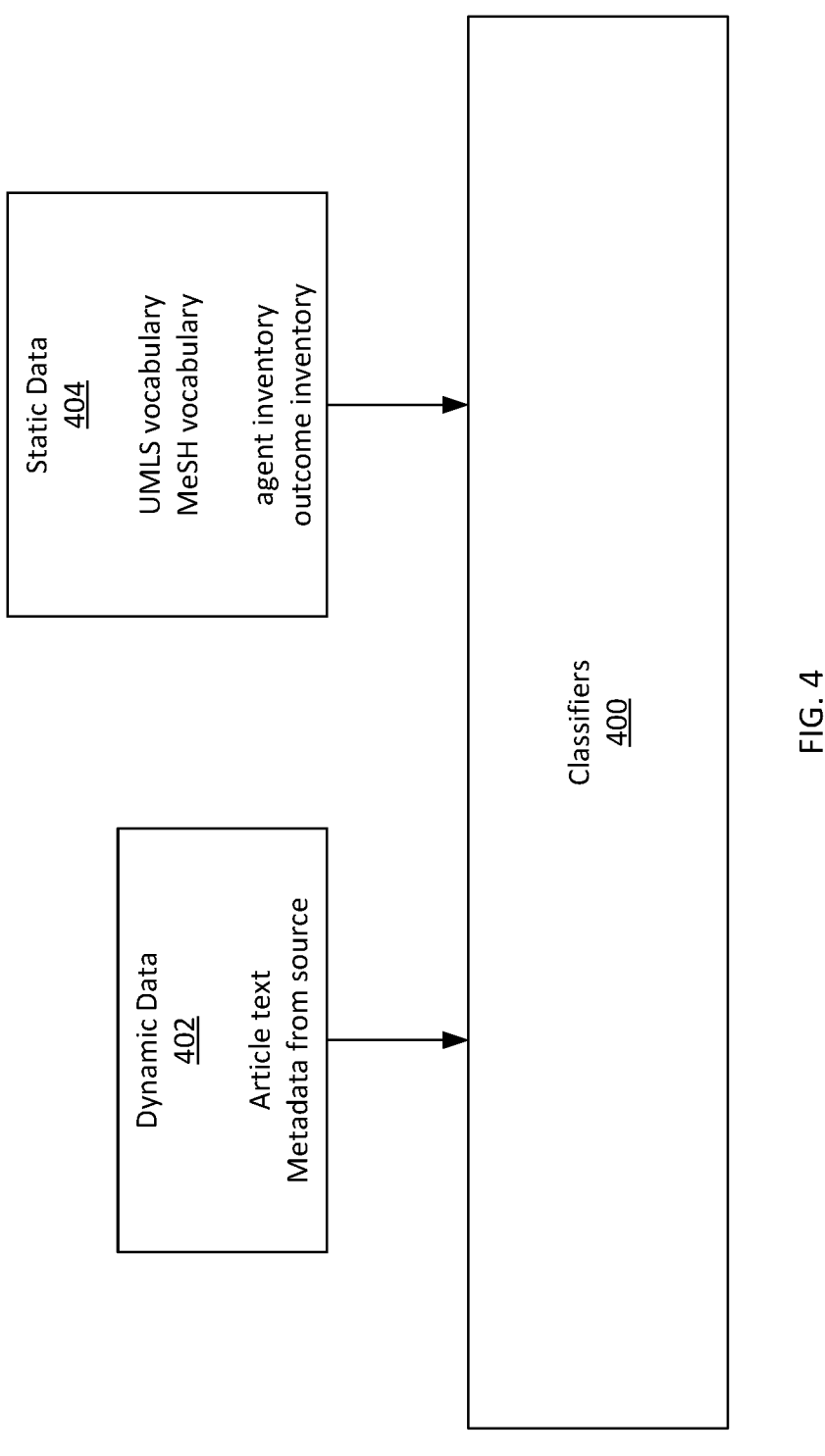
FIG. 4 illustrates an exemplary data flow according to examples of the disclosure.

FIG. 4 illustrates an exemplary data flow according to examples of the disclosure. Metadata can be generated automatically by applying natural language processing techniques to article and/or abstract text. For example, one or more classifiers 400 may be applied to abstract text to generate relevance, directionality, proximity, and/or evidence level metadata for the abstract. Although examples are generally described with reference to abstracts and abstract text, the examples are not so limited and metadata may be generated according to the disclosed methods based on any or all of abstract text, article text, and/or metadata, among other possibilities.

Each classifier may take as input dynamic data 402. Dynamic data may include data specific to a particular article or abstract. This may include abstract text, article text, and/or metadata from a literature source (e.g., literature source 200), among other possibilities. Metadata from the literature source may include author, title, journal information, keywords, terms, study type, time period, MeSH terms, and/or tags, among other possibilities.

Each classifier may also take as input static data 404. Static data may include data that is used for classifying more than one article or abstract. In particular, such static data may be used for feature extraction. For example, static data may include an inventory of risk agents, an inventory of outcome categories, vocabularies and thesauruses (e.g., Unified Medical Language System (UMLS), Medical Subject Headings (MeSH), etc.), among other possibilities. In some examples, vocabularies and thesauruses may be used to normalize any risk agents or outcome categories identified in the dynamic data 402 against an inventory of risk agents and outcome categories (e.g., an abstract might mention "leukemia" and a thesaurus might be used to map such a mention to a "blood cancer" outcome category in an inventory of outcome categories).

FIGS. 5A-5D illustrate exemplary classifier structures for generating relevance data, directionality data, proximity data, and evidence data according to examples of the disclosure. Although each exemplary classifier describes particular features (agent terms, outcome terms, etc.), techniques (e.g., regular expression, term frequency, information gain, etc.), and classifier types (support vector machine, ensemble-based, random forest, etc.), examples of the disclosure are not so limited and may include additional or alternative features, techniques, and classifier types, and examples of the disclosure contemplate using any combination of the described methods. Although multiple techniques may be shown for each feature, the feature extraction may only use a subset of those techniques or alternative techniques.

In some examples, a feature extraction technique may process input (e.g., abstract text) to produce one or more data sets that are suitable for input into a classifier. For example, one important feature may be the occurrence of terms referring to a particular outcome, such as hemolytic anemia. In such a case abstract text may be processed to produce a count of such terms using a vocabulary or thesaurus such as UMLS to produce a single count that includes instances of "hemolytic anemia" as well as its synonyms (e.g., "haemolyticus anaemia").

In some examples, techniques may be combined in the extraction of a single feature or related features. For example, part-of-speech tagging and/or tokenization may be used before counting term frequency to produce a more accurate term frequency count and/or to save processing time.

In some examples, features may be combined in a feature vector that is suitable for input to a classifier. For example, a classifier may take as input a 7-element vector where each of the 7 elements represents a different feature (e.g., the first element always represents the same feature, the second element always represents a second, different feature, etc.). For some feature vectors and classifiers, a special data structure for sparse vectors (e.g., a list of index-value pairs, among other possibilities) may be used to save storage space and/or processing time.

Figure 5A:
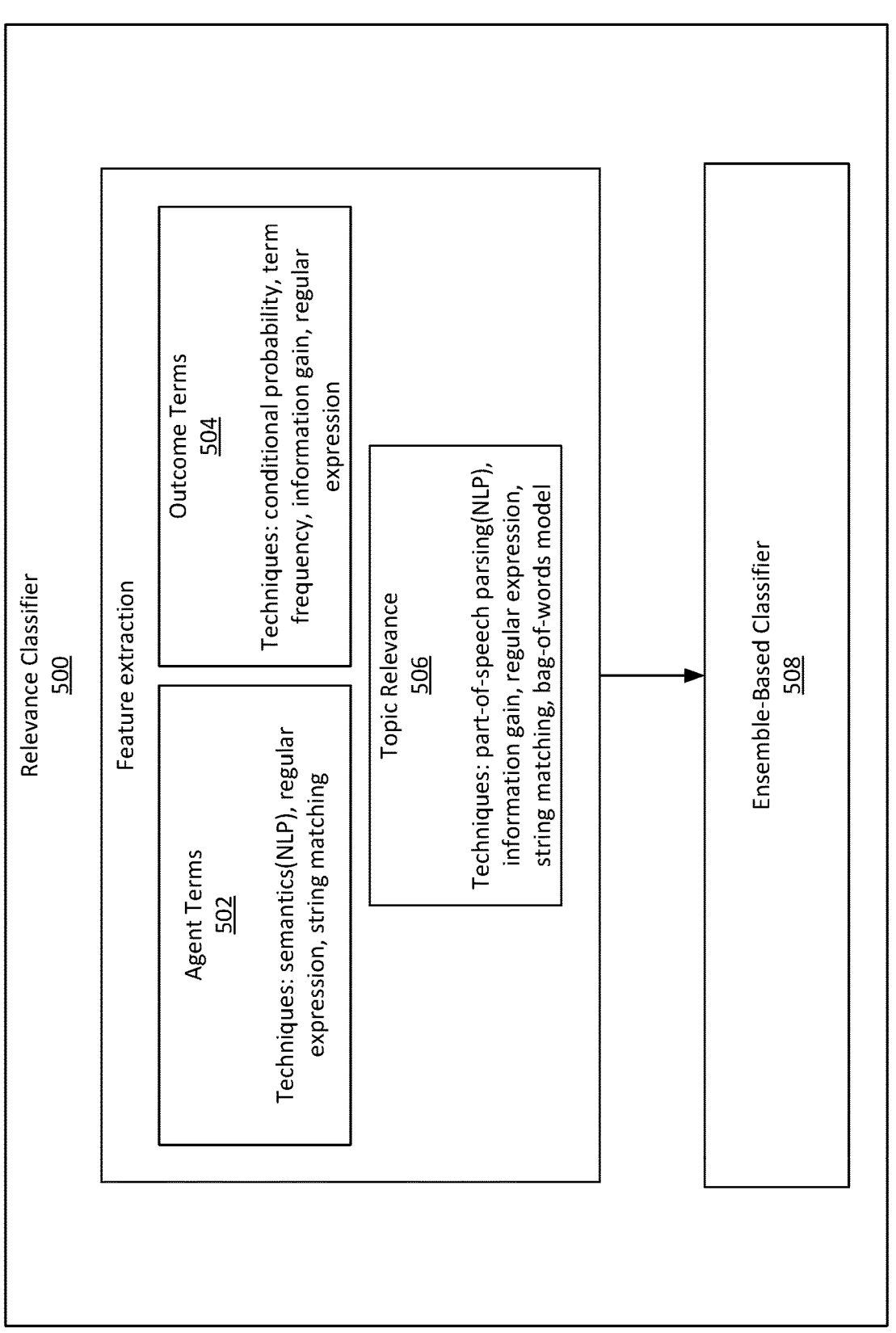
FIGS. 5A-5D illustrate exemplary classifier structures for generating relevance data, directionality data, proximity data, and evidence data according to examples of the disclosure.

FIG. 5A illustrates a relevance classifier 500 that extracts features related to agent terms 502, outcome terms 504, and topic relevance 506, and those features flow into an ensemble-based classifier 508 (e.g., gradient boosting, random forest, among other possibilities) that outputs relevance data. The features roughly correspond to three separate, related tasks in identifying whether or not an article is relevant to an agent-outcome hypothesis based on the abstract text: (1) determining whether the abstract text refers to the agent (agent terms 502), (2) determining whether the abstract text refers to the outcome (outcome terms 504), and (3) determining whether the abstract text refers to a causation hypothesis that the agent causes the outcome (topic relevance 506).

The agent terms 502 and the outcome terms 504 feature extraction steps focus on matching agent and outcome terms (via vocabularies and thesauruses such as UMLS and MeSH) using the techniques illustrated in FIG. 5A.

In some examples, a feature vector may include, for agent terms 502, a count of terms associated with the agent and a count of terms associated with agents other than the agent. Similarly, in some examples, a feature vector may include, for outcome terms 504, a count of terms associated with the outcome and a count of terms associated with outcomes other than the outcome. By including a feature for matching terms and a different feature for terms that match other agents/outcomes, the classifier may be better able to distinguish between relevant and irrelevant abstracts.

Topic relevance 506 feature extraction focuses on identifying whether an abstract refers to matched agent/outcome terms in a way that implies the agent causes (or does not cause) the outcome. For example, semantics, part-of-speech tagging, and/or dependency parsing may be used to distinguish a phrase that actually refers to the agent causing the outcome as opposed to incidentally mentioning the agent and the outcome (e.g., for a BPA causes cancer hypothesis, "BPA-induced cancer" refers to the hypothesis vs. "BPA was found in the environment along with cancer-causing substances such as benzidine" mentions both agent and outcome but does not refer to the hypothesis).

In some examples, a respective relevance score for an agent/outcome hypothesis may be determined for all available abstracts. In other examples, the set of available abstracts may first be filtered based on a word/tag/category search or similar based on terms associated with the agent/outcome hypothesis, and then only that subset of filtered abstracts may be considered for the relevance classifier for that agent/outcome hypothesis.

Figure 5B:
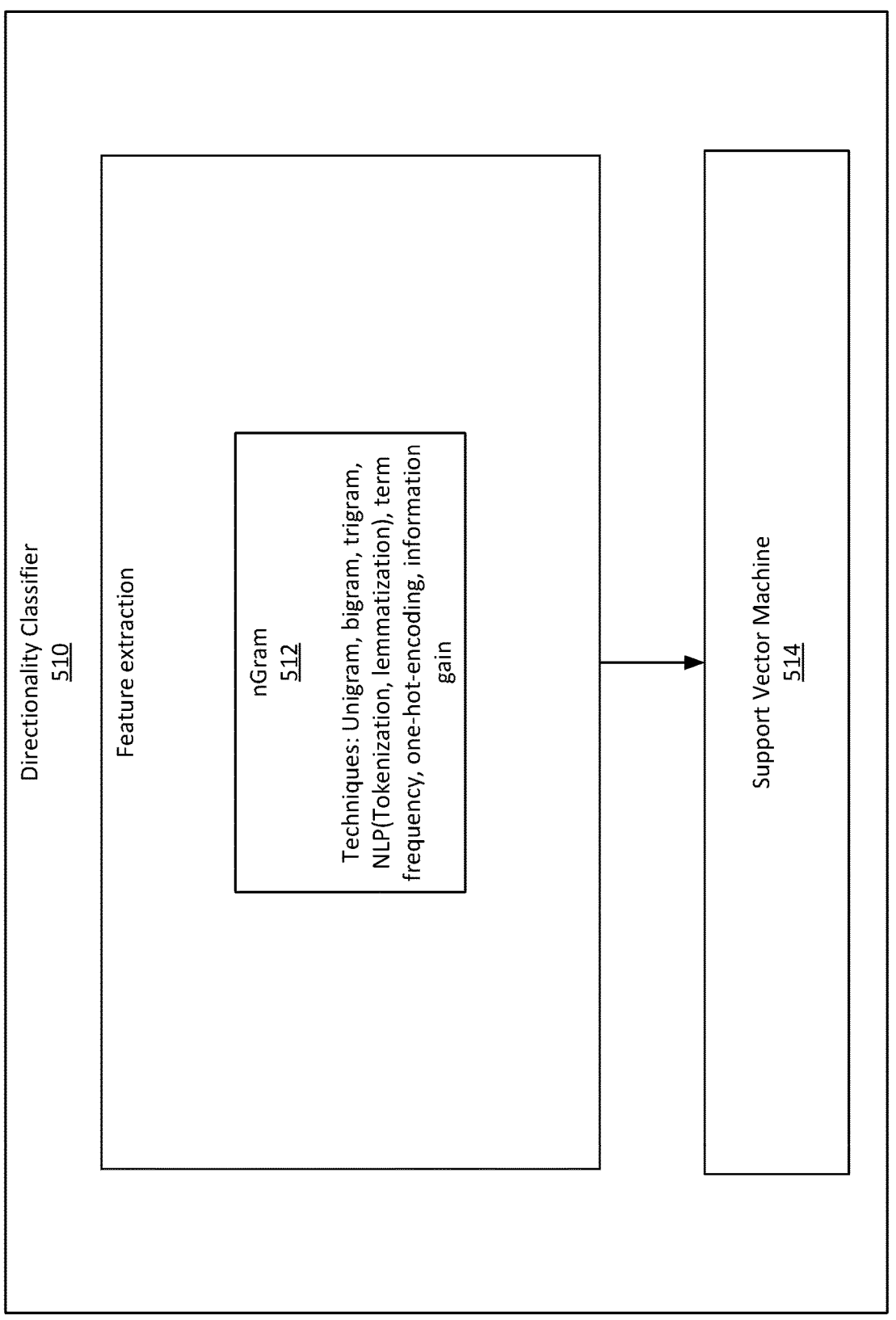

FIG. 5B illustrates a directionality classifier 510 that extracts nGram features 512 that flow into a support vector machine 514 that outputs directionality data. In some examples, the presence and/or frequency of keywords related to directionality may be used as features 512 for the support vector machine 514. Such keywords may be learned automatically via a correlation analysis to identify phrases and/or tokens from abstract text that indicate: (1) the corresponding study supports the agent-outcome hypothesis, (2) the corresponding study rejects the agent-outcome hypothesis, and/or (3) the corresponding study is uncertain on the agent-outcome hypothesis. For example, the phrase "causes" might indicate the corresponding study supports the agent-outcome hypothesis, whereas the phrase "does not cause" might indicate the corresponding study rejects the agent-outcome hypothesis.

In some examples, each element of a feature vector (or a subset of the feature vector) in the directionality classifier 510 may correspond to a phrase and/or token related to directionality and the value of the element may be a count of instances of the phrase/token in the abstract text. Other techniques for feature extraction illustrated in FIG. 5B may be used in combination with, alternatively to, or as pre- or post-processing steps to such term frequency counting.

Figure 5C:
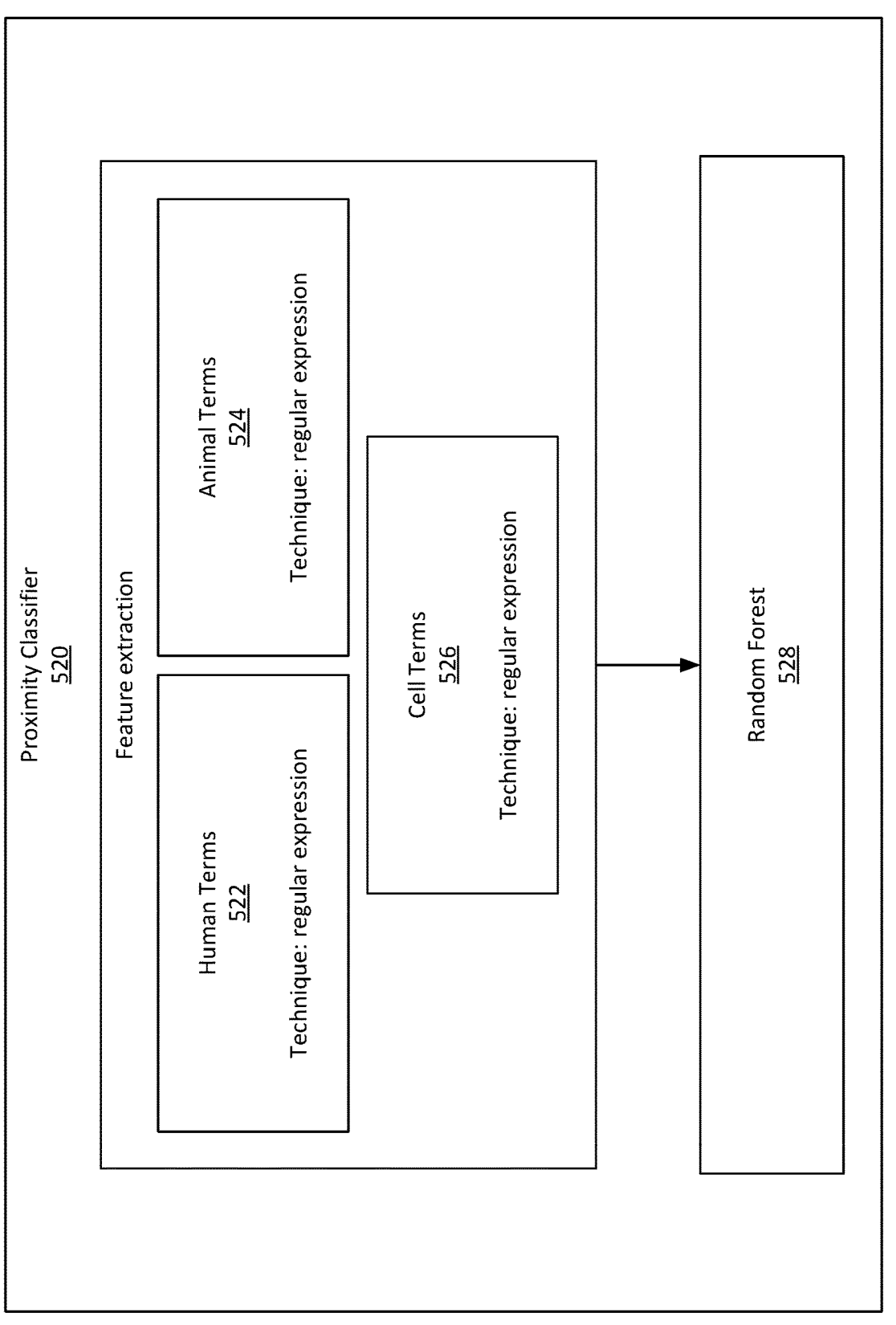

FIG. 5C illustrates a proximity classifier 520 that extracts features including human terms 522, animal terms 524, and/or cell terms 526 that flow into one or more random forest classifier(s) 528 that outputs proximity data. In some examples, the feature extraction may use regular expressions to count the number of human study-related terms, the number of animal study-related terms, and the number of cell study-related terms in the abstract text, and the respective counts may be included in the feature vector that flows into the random forest classifier 528 to determine whether the abstract text describes a human study, an animal study, or a cell study.

Figure 5D:
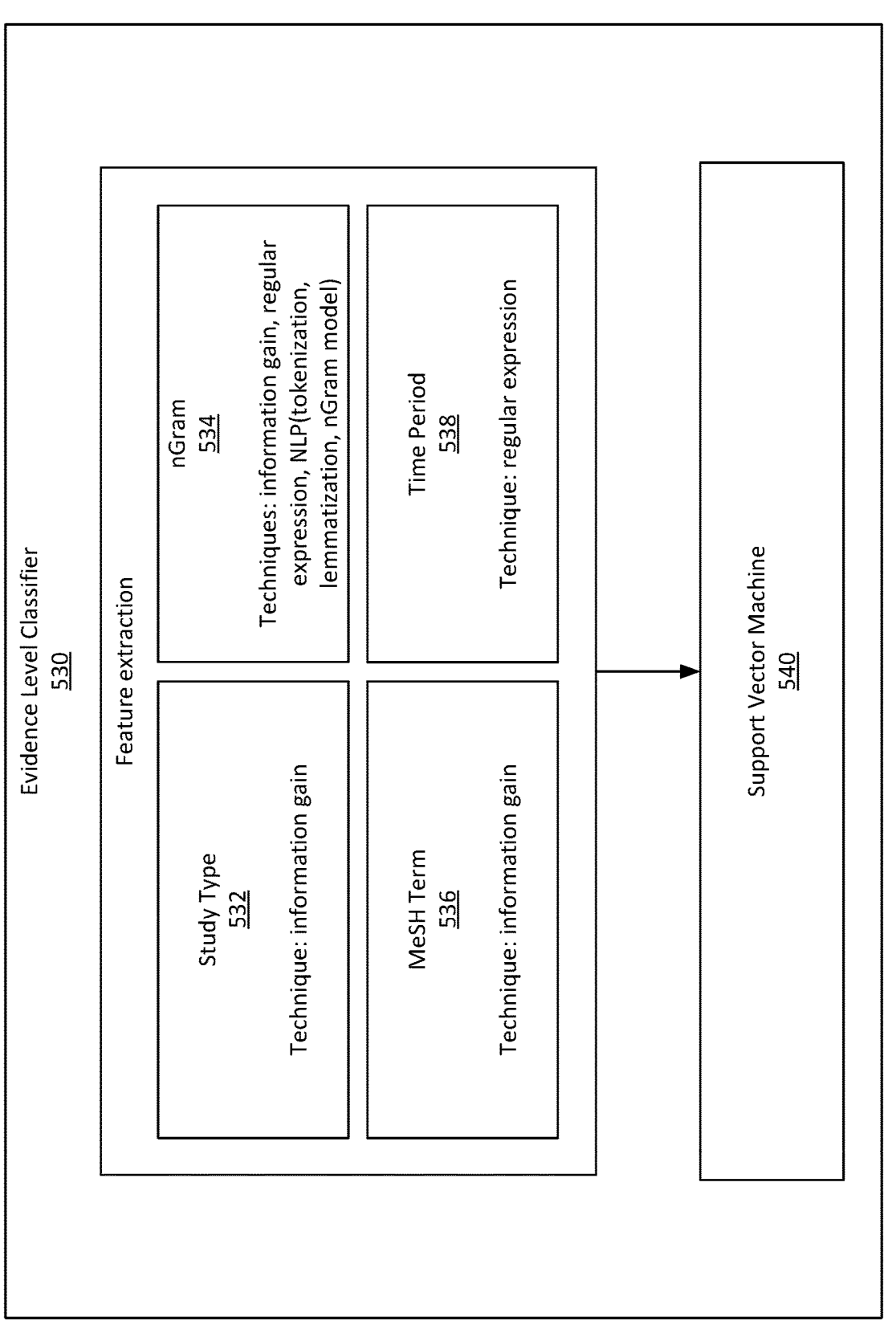

FIG. 5D illustrates an evidence level classifier 530 that extracts features including study type 532, nGram features 534, MeSH terms 536, and/or year period 538, and those features flow into a support vector machine 540 that outputs evidence data. As evidence level is a measure of ability of the methodology of a study to demonstrate a causal relationship between the agent and the outcome, the selection of features is directed to tease out different aspects of the methodology.

For example, study type 532 (e.g., randomized controlled vs. clinical trial), year period 538 (e.g., 1990-2000, as in a longitudinal cohort study vs. a single year in an observational study), and MeSH terms 536 (e.g., keywords from the MeSH vocabulary identifying key topics or descriptors of the study) may be obtained directly from metadata associated with the abstract text and readily available from a literature source (e.g., PubMed). In addition, nGram features 534 such as keywords, tokens, and/or phrases that may indicate a certain study methodology (e.g., "confidence interval", "odds ratio", etc.) may be extracted and included in a feature vector via natural language processing techniques.

In some examples, different evidence level classifiers 530 may be used for different proximity categorizations. For example, an abstract identified as a cell study (in vitro) may not have different evidence level classifications in some examples (e.g., if methodologies of in vitro studies don't differ much in their relative abilities to demonstrate a causal relationship). Additionally, animal and human studies may be different enough that different evidence level classifiers may be trained to produce different evidence data determinations for animal and human proximity categorizations, respectively.

For example, evidence data output for animal studies may distinguish between mammal and non-mammal studies, whereas evidence data output for human studies may not make such a distinction. Similarly, evidence data output for human studies may distinguish cohort studies and case series studies from controlled, observational, and meta studies, whereas evidence data output for animal studies may only distinguish controlled, observational, and meta studies, without any cohort studies or case series studies.

In some examples, magnitude data may also be automatically generated using natural language processing techniques described herein (e.g., regular expressions, tokenization, etc.) to identify an odds ratio in abstract or article text (e.g., by searching for the text "odds ratio" and finding a number formatted as an odds ratio near that text or anywhere in the abstract text), and then storing that odds ratio as the magnitude data for the article or abstract. In some examples, the odds ratio may be included as metadata provided by the literature source, and that odds ratio from the literature source can be used as the magnitude data.

Exemplary Methods

FIG. 6 is a flow diagram illustrating a method of updating a general causation visualization for an agent (e.g., a material, substance, process, practice, or phenomenon, etc.) and an outcome (e.g., bodily injury, property damage, environmental damage, etc.) in accordance with some embodiments. The method is optionally performed at an electronic device as described above with reference to FIGS. 2A-2D (e.g., electronic device 202) to update the general causation visualization displayed on a remote device (e.g., a remote computer, laptop, smartphone, etc., such as remote device 204). Optional or alternative operations in FIG. 6 are indicated in dashed boxes. Some operations in the method are, optionally, combined and/or the order of some operations is, optionally, changed. In some examples, any reasonable subset of the operations illustrated in FIGS. 6, 7A-7B, and 8 may be combined. One of ordinary skill in the art would recognize various ways to reorder and recombine the operations illustrated in FIGS. 6, 7A-7B, and 8 and described otherwise herein.

On a regular time interval (e.g., every hour, every day, every month, etc.; in some examples, polling may occur intermittently on an irregular time interval), an electronic device 202 polls (601) a remote source 200 of scientific literature articles (e.g., a public or private web site or other electronic server such as PubMed or similar; in some examples, articles may include article text or may be only abstract text and/or metadata associated with an article) for new scientific literature articles (e.g., accessing the remote source via a web request, API request, or similar and retrieving an indication that there are new scientific literature articles; in some examples, polling for new articles may include downloading a list of articles and comparing it to a previously downloaded list of articles).

In response to the polling of the source of scientific literature articles, the electronic device 202 downloads (603) a first set of new scientific literature articles from the source 200 of scientific literature articles (e.g., after confirming that the source has new articles, downloading those articles; in some examples, only new articles that meet certain criteria may be downloaded).

After downloading the first set of new scientific literature articles, the electronic device 202 automatically generates (605) a set of update metadata (e.g., algorithmically generating metadata for each article using natural language processing, wherein the metadata includes relevance data, directionality data, evidence data, and/or proximity data, among other possibilities), including generating metadata for each article in the first set of new scientific literature articles.

In some examples, generating metadata for each article in the first set of new scientific literature articles includes determining (607) whether a first article in the first set of new scientific literature articles is relevant to a causation hypothesis that the agent causes the outcome. In some examples, determining whether the first article is relevant to the causation hypothesis includes: determining whether the first article is relevant to the agent based on a plurality of agent terms associated with the agent (e.g., by including in a feature vector a count of agent terms in the abstract text associated with the first article); determining whether the first article is relevant to the outcome based on a plurality of outcome terms associated with the outcome (e.g., by including in a feature vector a count of outcome terms in the abstract text associated with the first article); and determining whether the first article is relevant to the causation hypothesis based on a plurality of causation terms associated with causation (e.g., by including in a feature vector a count of causation terms in the abstract text associated with the first article).

In some examples, generating metadata for each article in the first set of new scientific literature articles includes generating (609) directionality data for each article, indicating whether the respective article supports or rejects a hypothesis that the agent causes the outcome, generated using natural language processing on the text of the respective article (e.g., processing the respective article (as unigrams, bigrams, and/or trigrams, among other possibilities) using a support vector machine or similar classifier based on terms indicating causation, wherein the terms have been identified using correlation analysis on training data, to classify the article as either supporting or rejecting the hypothesis).

In some examples, generating metadata for each article in the first set of new scientific literature articles includes generating (611) evidence data for each article, indicating how well methodology of the respective article can demonstrate a causal relationship between the agent and the outcome, generated using natural language processing on the text of the respective article (e.g., processing the respective article using a support vector machine or similar classifier based on terms indicating study methodology, to classify the article as being a meta study, controlled study, cohort study, observational study, and/or case report, among other possibilities; in some examples, the specific classifier used may be one trained specifically for the proximity categorization of the respective article (e.g., if the study is categorized as human, a classifier trained for human articles may be used, versus a classifier trained for animal articles if the study is categorized as animal, etc.)).

In some examples, generating metadata for each article in the first set of new scientific literature articles includes generating (613) a proximity categorization for each article, indicating directness of evidence in the respective article, generated using natural language processing on the text of the respective article (e.g., processing the respective article using a decision tree, random forest, or similar classifier based on terms indicating human, animal, or cell evidence, to classify the article as having human, animal, and/or cell evidence for or against the hypothesis, among other possibilities).

The electronic device 202 aggregates (615) the update metadata with existing metadata to obtain aggregate metadata, wherein a first causation score has been previously computed based on the existing metadata and not based on the update metadata.

The electronic device 202 computes (617) a second causation score based on the aggregate metadata (e.g., the second causation score is computed based on updated information from the newly downloaded articles, whereas the first causation score was based on the prior existing metadata without the information from the newly downloaded articles).

While the remote device 204 is displaying a representation of the first causation score (e.g., displaying a textual representation of the first causation score, and/or displaying a visualization of the first causation score on a plot or other visualization, among other possibilities), the electronic device 202 pushes (619) the second causation score to the remote device (e.g., sending a representation of the second causation score in response to a request from the remote device, among other possibilities), wherein the remote device updates the general causation visualization to display a representation of the second causation score instead of the representation of the first causation score (e.g., replacing a textual representation of the first causation score with a textual representation of the second causation score, and/or replacing a visualization of the first causation score on a plot with a visualization of the second causation score on the same plot, among other possibilities).

In some examples, the general causation visualization plots causation scores over time, and updating the general causation visualization to display the representation of the second causation score instead of the representation of the first causation score includes replacing the representation of the first causation score at a location associated with a first time period with the representation of the second causation score at the location associated with the first time period (e.g., the first and second causation scores are associated with the same time period (e.g., a particular month, a particular quarter, a particular year, etc.), but the second causation score includes additional data from that same time period that had not yet been published when the first causation score was calculated; in some examples, replacing can include an animation of a point on the plot moving from a first location associated with the first causation score to a second location associated with the second causation score).

In some examples, the general causation visualization plots causation scores over time, the representation of the first causation score is displayed at a location associated with a first time period, and updating the general causation visualization to display the representation of the second causation score instead of the representation of the first causation score includes displaying the representation of the second causation score at a second location associated with a second time period, different from the first time period (e.g., the first causation score is associated with May 2018, the second causation score is associated with June 2018, and the second causation score replaces the first causation score as the most recent causation score).

In some examples, the general causation visualization includes a ranked list of causation scores, and updating the general causation visualization further includes reordering the list based on the second causation score instead of the first causation score.

In some examples, updating the general causation visualization further includes changing an element of the general causation visualization from a first color associated with the first causation score to a second color associated with the second causation score.

In some examples, the general causation visualization includes a plurality of causation score representations for causation scores of different agents.

In some examples, the general causation visualization includes a plurality of causation score representations for different outcomes and all associated with a single agent.

In some examples, the general causation visualization includes a plurality of causation score representations for different causation scores of a single agent over time.

Figure 7B:
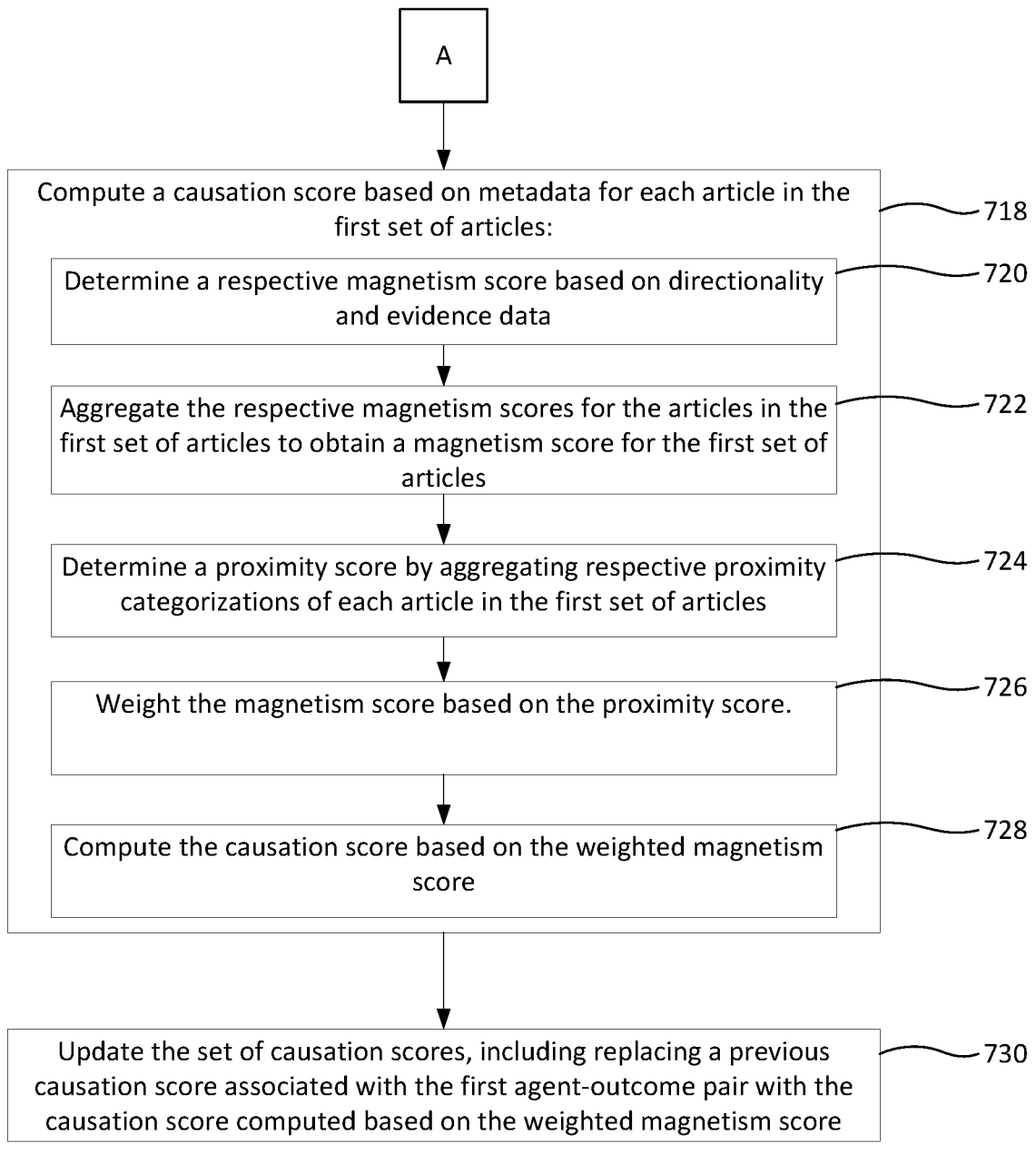

FIGS. 7A-7B are flow diagrams illustrating a method of updating a set of causation scores, each respective causation score corresponding to one of a plurality of agent-outcome pairs in accordance with some embodiments. The method is optionally performed at an electronic device as described above with reference to FIGS. 2A-2D (e.g., electronic device 202). Optional or alternative operations in FIGS. 7A-7B are indicated in dashed boxes. Some operations in the method are, optionally, combined and/or the order of some operations is, optionally, changed. In some examples, any reasonable subset of the operations illustrated in FIGS. 6, 7A-7B, and 8 may be combined. One of ordinary skill in the art would recognize various ways to reorder and recombine the operations illustrated in FIGS. 6, 7A-7B, and 8 and described otherwise herein.

On a regular time interval, the electronic device 202 polls (702) a source 200 of scientific literature articles for new scientific literature articles.

In response to the polling of the source 202 of scientific literature articles, the electronic device 202 downloads (704) a plurality of new scientific literature articles from the source of scientific literature articles.

For each respective article in the plurality of new scientific literature articles, the electronic device 202 automatically classifies (706) the respective article as relevant or not relevant to each respective agent-outcome pair in the plurality of agent-outcome pairs, based on natural language processing on the text of the respective article (e.g., classifying the respect article as relevant or not relevant based on fuzzy matching of the article text with the agent and the outcome and/or synonyms of the agent and outcome, and/or determining relevance based on dependency parsing of terms in the article that link the matched agent with the matched outcome, among other possibilities).

The electronic device 202 aggregates (708), into a first set of articles, a subset of the plurality of new scientific literature articles that are classified as relevant to a first agent-outcome pair including a first agent and a first outcome (e.g., for the purposes of computing a causation score for the agent-outcome pair, using only metadata for the articles that are relevant to the agent-outcome pair).

The electronic device 202 generates (710) metadata for each article in the first set of articles by: generating (712) directionality data for each article, indicating whether the respective article supports or rejects a hypothesis that the first agent causes the first outcome, generated using natural language processing on the text of the respective article; generating (714) evidence data for each article, indicating how well methodology of the respective article can demonstrated a causal relationship between the first agent and the first outcome, generated using natural language processing on the text of the respective article; and generating (716) a proximity categorization for each article, indicating directness of evidence in the respective article, generated using natural language processing on the text of the respective article.

The electronic device 202 computes (718) a causation score based on the metadata for each article in the first set of articles by: determining (720) a respective magnetism score for each respective article in the first set of articles based on the directionality data and the evidence data associated with the respective article (e.g., determining a magnetism score for an article by multiplying its directionality score by its evidence level score and/or applying a scaling factor based on the impact or quality of the journal in which the article was published, among other possibilities); aggregating (722) the respective magnetism scores for the articles in the first set of articles to obtain a magnetism score for the first set of articles (e.g., aggregating the respective magnetism scores by taking the sum of the respective magnetism scores, among other possibilities; in some examples, the sum of the respective magnetism scores may be multiplied by a tuning parameter and the hyperbolic tangent may be taken to obtain the magnetism score for the first set of articles); determining (724) a proximity score by aggregating respective proximity categorizations of each article in the first set of articles (e.g., determining a proximity score by adding weighted counts of the human studies, animal studies, and/or in vitro studies, and projecting the result such that a predominance of human articles results in a relatively higher score than a predominance of animal or invitro studies, among other possibilities); weighting (726) the magnetism score based on the proximity score (e.g., multiplying the scores together, among other possibilities); and computing (728) the causation score based on the weighted magnetism score (e.g., computing a causation score based on the weighted magnetism score and other scores, such as a magnitude score and/or a coherence score).

The electronic device 202 updates (730) the set of causation scores, including replacing a previous causation score associated with the first agent-outcome pair with the causation score computed based on the weighted magnetism score (e.g., replacing the previous causation score with the causation score as the most recently calculated score, and retaining the previous causation score as a historical causation score).

FIG. 8 is a flow diagram illustrating a method of updating a general causation visualization in accordance with some embodiments. The method is optionally performed at an electronic device as described above with reference to FIGS. 2A-2D (e.g., electronic device 202) to update the general causation visualization displayed on a remote device (e.g., a remote computer, laptop, smartphone, etc., such as remote device 204). Optional or alternative operations in FIG. 8 are indicated in dashed boxes. Some operations in the method are, optionally, combined and/or the order of some operations is, optionally, changed. In some examples, any reasonable subset of the operations illustrated in FIGS. 6, 7A-7B, and 8 may be combined. One of ordinary skill in the art would recognize various ways to reorder and recombine the operations illustrated in FIGS. 6, 7A-7B, and 8 and described otherwise herein.

The electronic device 202 displays (801), in the general causation visualization on the remote device 204, a plurality of causation score representations, each associated with a respective causation score (e.g., displaying a ranked list of agents with highest causation scores ranked from high to low, displaying a plot of causation scores for one or more agents and/or agent-outcome pairs over time, etc.), including displaying a first causation score representation associated with a first causation score computed based on literature metadata relevant to the first causation score.

While the plurality of causation score representations are displayed on the remote device 204, the electronic device 202 receives (803) indication of user input at the remote device selecting first literature criteria (e.g., a mouse click, keypress, touch input, etc. on a user interface element selecting the first literature criteria, wherein the literature criteria may include only journals at or above a certain quality/impact level, exclusion of one or more specific authors, etc.), wherein applying the first literature criteria to the literature metadata includes a first subset of the literature metadata and excludes a second subset of the literature metadata (e.g., if the first literature criteria only includes high quality journals, then the metadata in the first subset would be limited to articles from those journals and the metadata in the second subset would include articles not from those journals; if the first literature criteria excludes specific authors, then metadata in the first subset would be limited to articles not by those specific authors, and metadata in the second subset would only include articles by those authors).

In response to the user input at the remote device selecting the first literature criteria, the electronic device 202 computes (805) a plurality of updated causation scores including computing an updated first causation score based on the first subset of the literature metadata and not the second subset of the literature metadata (e.g., updated causation scores are computed in light of the selected criteria so that the new scores reflect only the metadata included based on the selected criteria) by: aggregating (807) respective magnetism scores for each article in the first subset to obtain a magnetism score for the first subset; determining (809) a proximity score by aggregating proximity categorizations of each article in the first subset; weighting (811) the magnetism score based on the proximity score; and computing (813) the first causation score based on the weighted magnetism score.

The electronic device 202 updates (815) the general causation visualization on the remote device 204 to display a plurality of updated causation score representations, each associated with a respective updated causation score in the plurality of updated causation scores (e.g., if the visualization is a ranked list of agents, then updating the visualization might include reordering the ranked list of agents based on the updated causation scores; if the visualization is a plot of causation scores over time, then updating the visualization might include adding the causation scores as additional points in the plot for a new time period).

The invention claimed is:

1. A computer-implemented method of updating a general causation visualization for an agent and an outcome displayed on a remote device, the method comprising:

on a regular time interval, polling a remote source of scientific literature articles for new scientific literature articles to track analysis of the agent and the outcome over time;

in response to the polling of the remote source of scientific literature articles, downloading a first set of new scientific literature articles from the remote source of scientific literature articles;

after downloading the first set of new scientific literature articles, generating a set of update metadata associated with the agent and the outcome for each article in the first set of new scientific literature articles, comprising:

generating directionality data for each respective article indicating whether the respective article supports or rejects a hypothesis that the agent causes the outcome, using natural language processing on text of the respective article, generating evidence data for each article indicating how well methodology of the respective article can demonstrate a causal relationship between the agent and the outcome using natural language processing on the text of the respective article, and generating a proximity categorization for each article indicating directness of evidence in the respective article using natural language processing on the text of the respective article;

aggregating the set of update metadata with the existing metadata to obtain aggregate metadata, wherein a first causation score has been previously computed based on the existing metadata and not based on the update metadata;

computing a second causation score based on the aggregate metadata; and while the remote device is displaying a representation of the first causation score, pushing the second causation score to the remote device, wherein the remote device updates the general causation visualization to display a representation of the second causation score instead of the representation of the first causation score.

2. The method of claim 1, wherein the general causation visualization plots causation scores over time, and updating the general causation visualization to display the representation of the second causation score instead of the representation of the first causation score includes:

replacing the representation of the first causation score at a location associated with a first time period with the representation of the second causation score at the location associated with the first time period.

3. The method of claim 1, wherein the general causation visualization plots causation scores over time, the representation of the first causation score is displayed at a location associated with a first time period, and updating the general causation visualization to display the representation of the second causation score instead of the representation of the first causation score includes:

displaying the representation of the second causation score at a second location associated with a second time period, different from the first time period.

4. The method of claim 1, wherein the general causation visualization includes a ranked list of causation scores, and updating the general causation visualization further includes reordering the ranked list based on the second causation score instead of the first causation score.

5. The method of claim 1, wherein updating the general causation visualization further includes changing an element of the general causation visualization from a first color associated with the first causation score to a second color associated with the second causation score.

6. The method of claim 1, wherein the general causation visualization includes a plurality of causation score representations for causation scores of different agents.

7. The method of claim 1, wherein the general causation visualization includes a plurality of causation score representations for different outcomes and all associated with a single agent.

8. The method of claim 1, wherein the general causation visualization includes a plurality of causation score representations for different causation scores of a single agent over time.

9. The method of claim 1, the method further comprising determining whether a first article in the first set of new scientific literature articles is relevant to a causation hypothesis that the agent causes the outcome by:

determining whether the first article is relevant to the agent based on a plurality of agent terms associated with the agent;

determining whether the first article is relevant to the outcome based on a plurality of outcome terms associated with the outcome; and determining whether the first article is relevant to the causation hypothesis based on a plurality of causation terms associated with causation.

10. A computer-implemented method of updating a set of causation scores, each respective causation score corresponding to one of a plurality of agent-outcome pairs, the method comprising:

on a regular time interval, polling a source of scientific literature articles for new scientific literature articles to track analysis of the agent and the outcome over time;

in response to the polling of the source of scientific literature articles, downloading a plurality of new scientific literature articles from the source of scientific literature articles;

for each respective article in the plurality of new scientific literature articles, classifying the respective article as relevant or not relevant to each respective agent-outcome pair in the plurality of agent-outcome pairs based on natural language processing on text of the respective article;

aggregating, into a first set of articles, a subset of the plurality of new scientific literature articles that are classified as relevant to a first agent-outcome pair including a first agent and a first outcome;

generating metadata for each article in the first set of articles by:

generating directionality data for each article, indicating whether the respective article supports or rejects a hypothesis that the first agent causes the first outcome, generated using natural language processing on the text of the respective article, generating evidence data for each article, indicating how well methodology of the respective article can demonstrated a causal relationship between the first agent and the first outcome, generated using natural language processing on the text of the respective article, and generating a proximity categorization for each article, indicating directness of evidence in the respective article, generated using natural language processing on the text of the respective article;

computing a set of causation scores based on the metadata for each article in the first set of article, comprising:

determining a respective magnetism score for each respective article in the first set of articles based on the directionality data and the evidence data associated with the respective article, aggregating the respective magnetism scores for the articles in the first set of articles to obtain a magnetism score for the first set of articles, weighting the magnetism score based on the proximity categorization for each article, and computing the causation score based on the weighted magnetism score; and updating the set of causation scores, including replacing a previous causation score associated with the first agent-outcome pair with the causation score computed based on the weighted magnetism score.

11. A computer-implemented method of updating a general causation visualization displayed on a remote device, the method comprising:

displaying, in the general causation visualization on the remote device, a plurality of causation score representations associated with an agent and an outcome of the agent, each associated with a respective causation score, comprising:

displaying a first causation score representation associated with a first causation score computed based on literature metadata relevant to the first causation score;

while the plurality of causation score representations are displayed on the remote device, receiving user input at the remote device selecting first literature criteria to update the plurality of causation score representations associated with the agent and the outcome of the agent, wherein applying the first literature criteria to the literature metadata includes a first subset of the literature metadata and excludes a second subset of the literature metadata;

in response to the user input at the remote device selecting the first literature criteria, computing a plurality of updated causation scores including computing an updated first causation score based on the first subset of the literature metadata and not the second subset of the literature metadata, comprising:

aggregating respective magnetism scores for each article in the first subset to obtain a magnetism score for the first subset, weighting the magnetism score based on proximity categorizations of each article in the first subset, and computing the first causation score based on the weighted magnetism score; and updating the general causation visualization on the remote device to display a plurality of updated causation score representations associated with the, each associated with a respective updated causation score in the plurality of updated causation scores.

\* \* \* \* \*